United States Patent
Igarashi et al.

(10) Patent No.: US 8,647,461 B2
(45) Date of Patent: Feb. 11, 2014

(54) METHOD FOR MANUFACTURING MULTILAYER FOAM

(75) Inventors: Yu Igarashi, Yamato (JP); Takehiko Sumi, Yamato (JP); Masaaki Onodera, Yamato (JP); Yoshinori Ohno, Yamato (JP); Naoya Kanou, Yamato (JP)

(73) Assignee: Kyoraku Co. Ltd., Tokyo (JP)

( * ) Notice: Subject to any disclaimer, the term of this patent is extended or adjusted under 35 U.S.C. 154(b) by 0 days.

(21) Appl. No.: 13/191,544

(22) Filed: Jul. 27, 2011

(65) Prior Publication Data

US 2012/0024459 A1     Feb. 2, 2012

(30) Foreign Application Priority Data

Jul. 27, 2010    (JP) .................................. 2010-168387

(51) Int. Cl.
     *B32B 3/06*      (2006.01)

(52) U.S. Cl.
     USPC ........................................... 156/245; 156/77

(58) Field of Classification Search
     USPC ........................................................ 156/77
     See application file for complete search history.

(56) References Cited

U.S. PATENT DOCUMENTS

| | | | | |
|---|---|---|---|---|
| 4,617,077 A | * | 10/1986 | Giese et al. | 156/245 |
| 8,343,413 B2 | * | 1/2013 | Onodera et al. | 264/547 |
| 2008/0261016 A1 | | 10/2008 | Tamada et al. | |
| 2011/0101558 A1 | * | 5/2011 | Onodera et al. | 264/51 |

FOREIGN PATENT DOCUMENTS

| | | | |
|---|---|---|---|
| JP | 09070879 A | * | 3/1997 |
| JP | 2004-82332 | | 3/2004 |
| JP | 2004082332 A | * | 3/2004 |
| JP | 2009-233960 | | 10/2009 |

* cited by examiner

*Primary Examiner* — Philip Tucker
*Assistant Examiner* — Vicki Wu
(74) *Attorney, Agent, or Firm* — Maine Cernota & Rardin

(57) ABSTRACT

A method for manufacturing multilayer foam where easy generation of dead air and improvement in foam magnification is offered. Multilayer resin that has non-foam layer outside foam layer is pushed out, the innermost side of the multilayer resin is bonded mutually, and multilayer resin laminating body is formed. Multilayer resin laminating body is clamped in the empty space between outermost side of multilayer resin laminating body and cavity side with metal mold. Multilayer resin laminating body is molded in the shape along cavity side, and the multilayer foam is molded.

8 Claims, 25 Drawing Sheets

METHOD FOR MANUFACTURING MULTILAYER FOAM

RELATED APPLICATIONS

This application claims priority to Japanese Patent Application No. 2010-168387, filed Jul. 27, 2010. This application is herein incorporated by reference in their entirety for all purposes.

FIELD OF THE INVENTION

The invention relates to a method for manufacturing multilayer foam.

BACKGROUND OF THE INVENTION

As the technical document applied for previous invention is the document that discloses the method for molding multilayer foam by carrying out the compression of multilayer parison in split-up metal mold and bonding the innermost side of the multilayer parison. (Refer to Patent document 1: Open disclosure No. 2004-82332 official report).

Concretely, multilayer parison 5 composed of foam layer 2 and the resin layer 3 as shown in FIG. 24 is pushed out of Die 21. Multilayer parison 5 is arranged between division metal mold 22a and 22b where pipe for decompression 23 is installed. and split metal mold 22a and 22b are closed while inserting multilayer parison 5 in split metal mold 22a and 22b. Multilayer parison 5 is stuck inside split metal mold 22a, 22b while transforming it in flat fan shape by compressing in cavity 24. And, as shown in FIG. 25 when the closing of split metal mold 22a and 22b is completed, at least a part of foam layers 2 composed of inner side of multi layer parison 5 is combined. Epidermal layer 13 attached to foaming molding goods foam layer 12 is molded.

[Patent Document 1] Published Examined Application No. 2004-82332

However, according to the method of patent document 1 mentioned above, multilayer parison 5 is compressed in split metal mold 22a, 22b, when a part in multilayer of parison 5 is bonded, the foam magnification of the multilayer foam that is the final molding goods will be decreased to crush the bubble in foam layer 2 where multilayer parison 5 is composed.

Moreover, multilayer parison 5 is compressed in split metal mold 22a, 22b. when innermost part of multilayer parison 5 is bonded, and air remains in multilayer parison 5. Air will be generated internally in the multilayer foam which is the final molding goods. When dead air is generated in inside part of multilayer foam, sled or sink is generated in multilayer foam that is the final molding goods.

The purpose of this invention is to offer the manufacturing method for Multilayer foam where enhancement of foam magnification is possible and considering the above mentioned circumstances, generation of dead air is difficult.

To achieve this purpose, this invention is assumed to have the following features.

SUMMARY OF THE INVENTION

The method for manufacturing multilayer foam of this invention is characterized by, extrusion process where multilayer resin having non-foam layer is pushed out outside foam layer, and bonding process that forms the multilayer resin laminating body by bonding inside the above-mentioned multilayer resin, and mold clamp process where above-mentioned multilayer resin laminating body is inserted in above-mentioned mold as the space between cavity side and outermost side of above mentioned multilayer resin laminating body and, the above-mentioned multilayer resin laminating body is molded in the shape along the above-mentioned cavity side and molding process of molding the multilayer foam.

According to this invention, before clamp molding of multilayer resin in mold, innermost side of multilayer resin is bonded. Dead air is not generated easily because the multilayer resin laminating body is formed. And, the foam magnification can be improved.

DETAILED DESCRIPTION

Exemplary Embodiments

Figure 1:
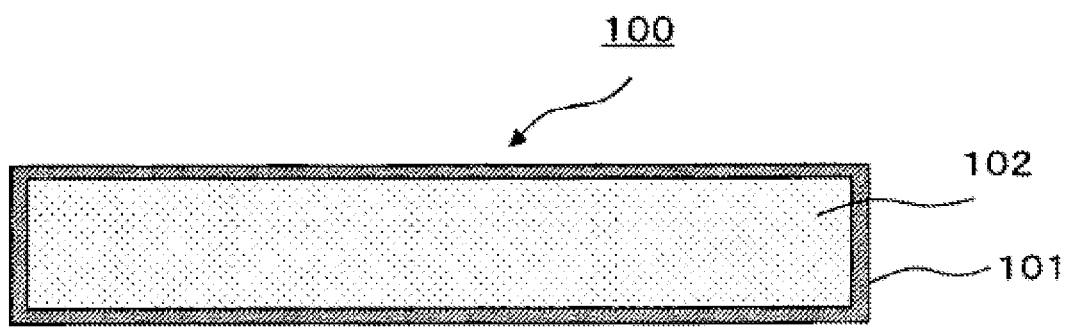
FIG. 1 illustrates composition example of multilayer foam 100 of this operation drawing.

FIG. 1 to FIG. 6 and FIG. 13 explains the brief description of multi layer foam 100 of this execution form. FIG. 1 shows the composition of multilayer foam 100 and FIG. 2-FIG. 6 and FIG. 13 shows example manufacturing method of example of manufacturing method for multilayer foam 100.

Multilayer foam 100 in this execution form composes non-foam layer 101 and foam layer 102 as shown in FIG. 1.

Figure 2:
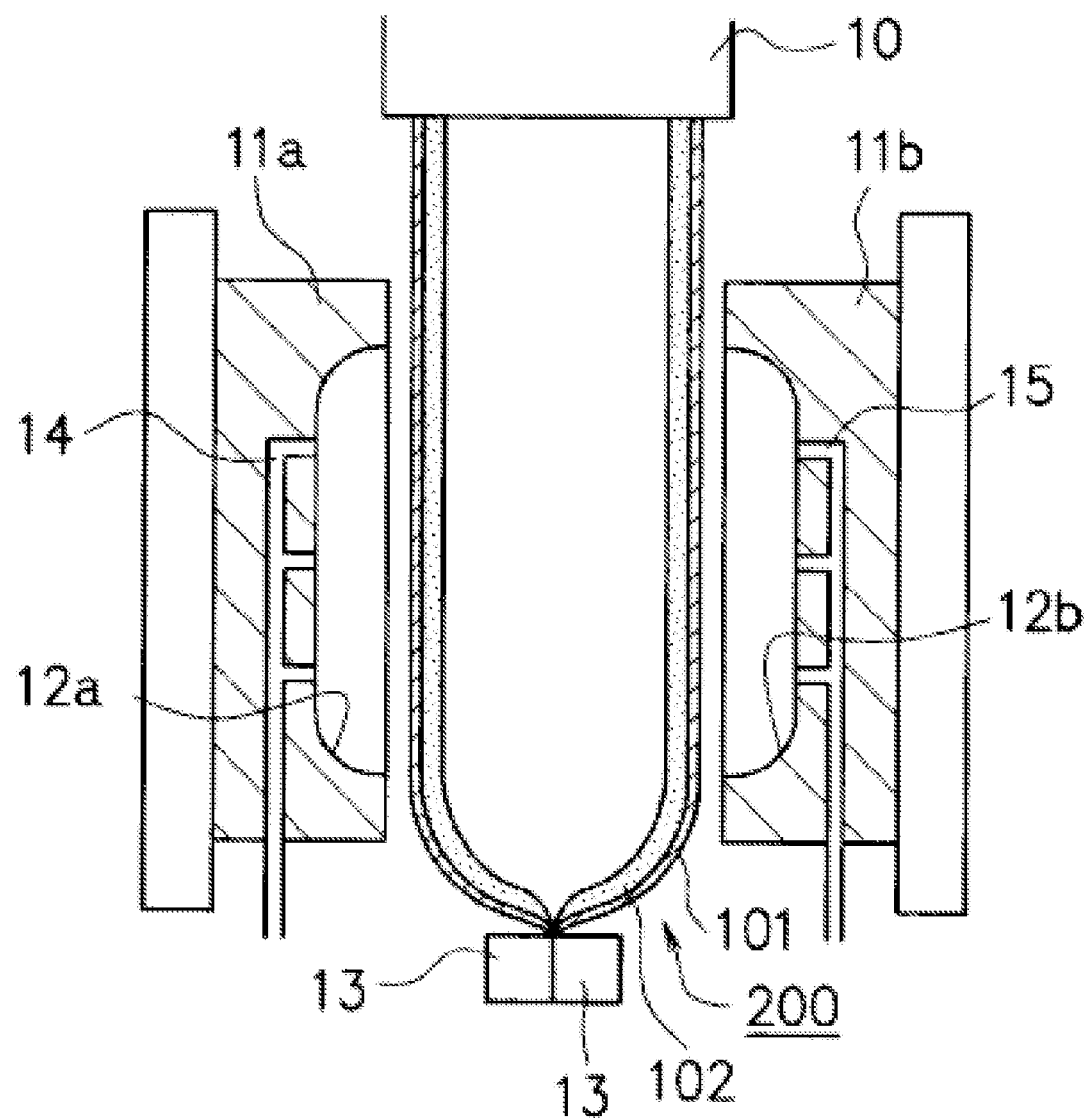
FIG. 2 is a $1^{st}$ drawing that illustrates example of method of manufacturing of multilayer foam 100 of first execution form.
Figure 3:
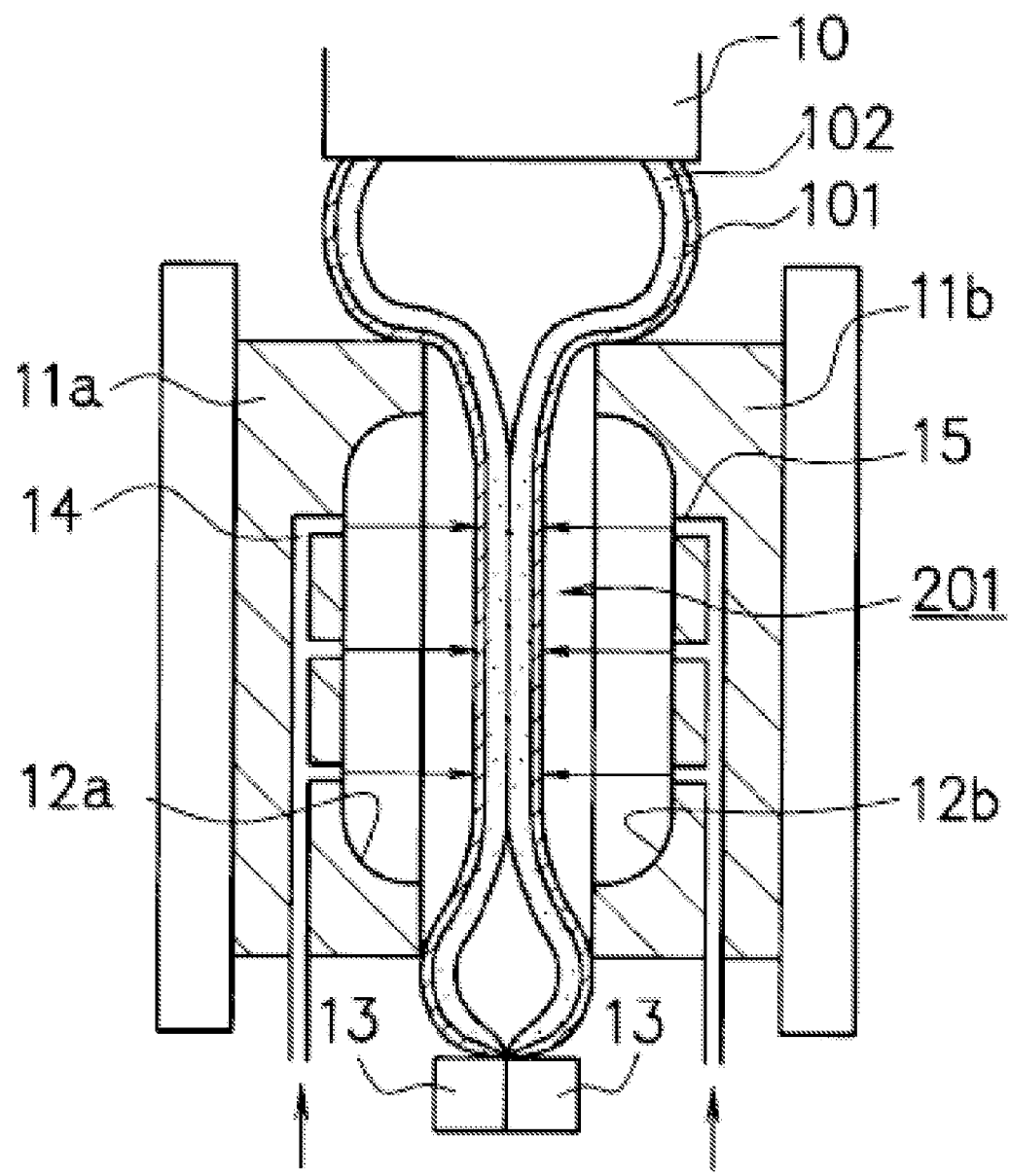
FIG. 3 is a $2^{nd}$ drawing that illustrates example of method of manufacturing of multilayer foam 100 of first execution form.
Figure 4:
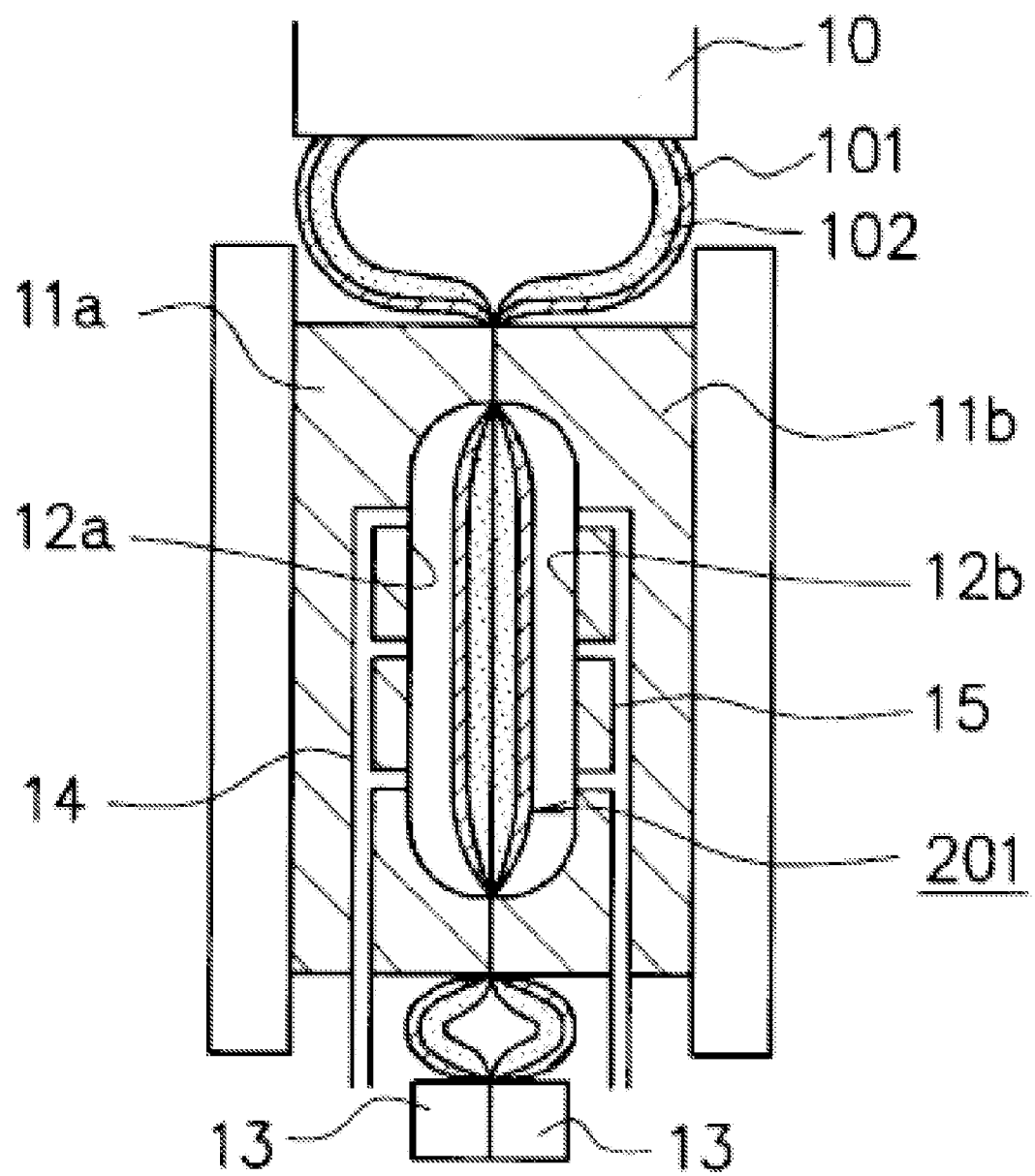
FIG. 4 is a $3^{rd}$ drawing that illustrates example of method of manufacturing of multilayer foam 100 of first execution form.
Figure 5:
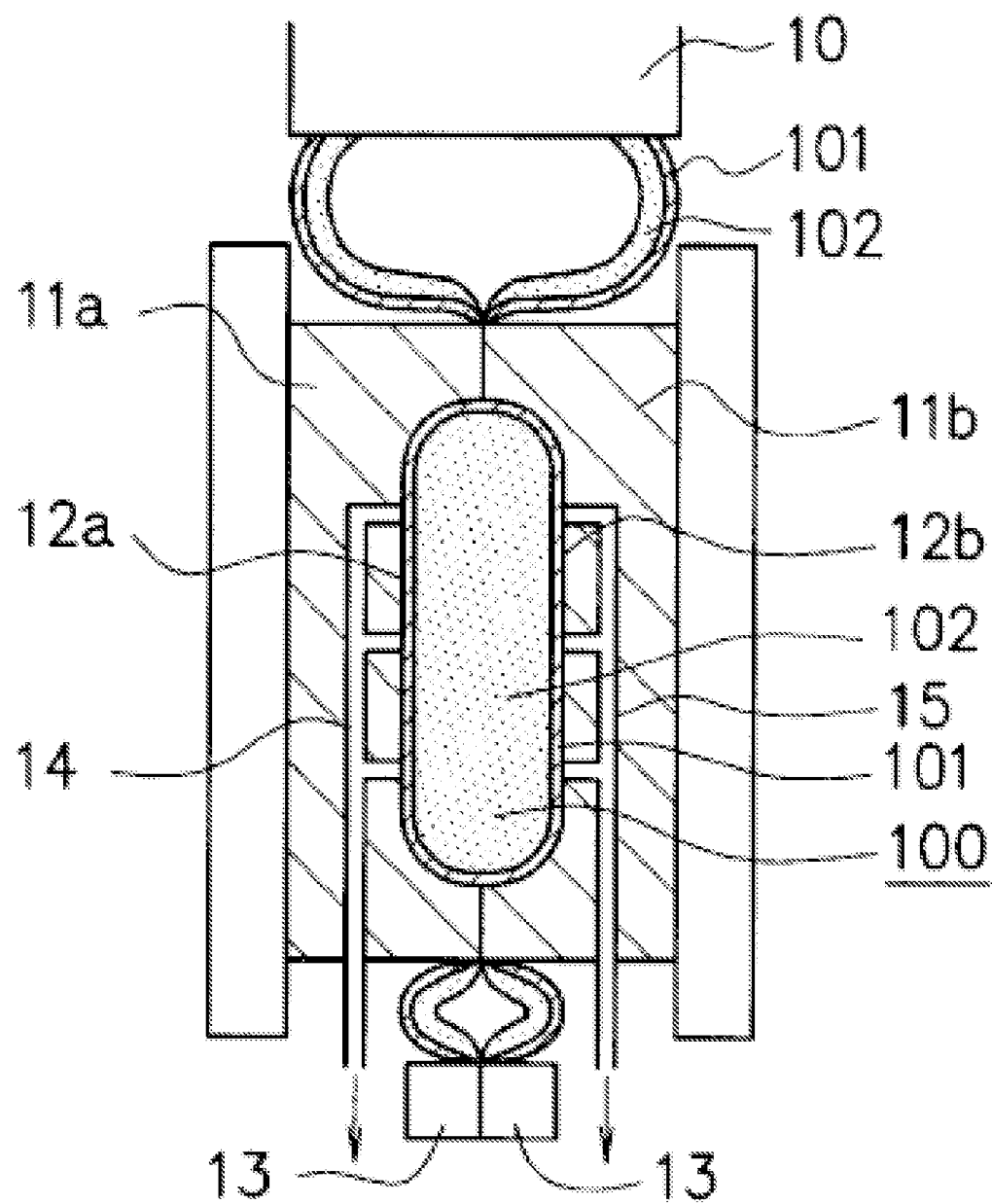
FIG. 5 is a $4^{th}$ drawing that illustrates example of method of manufacturing of multilayer foam 100 of first execution form.
Figure 6:
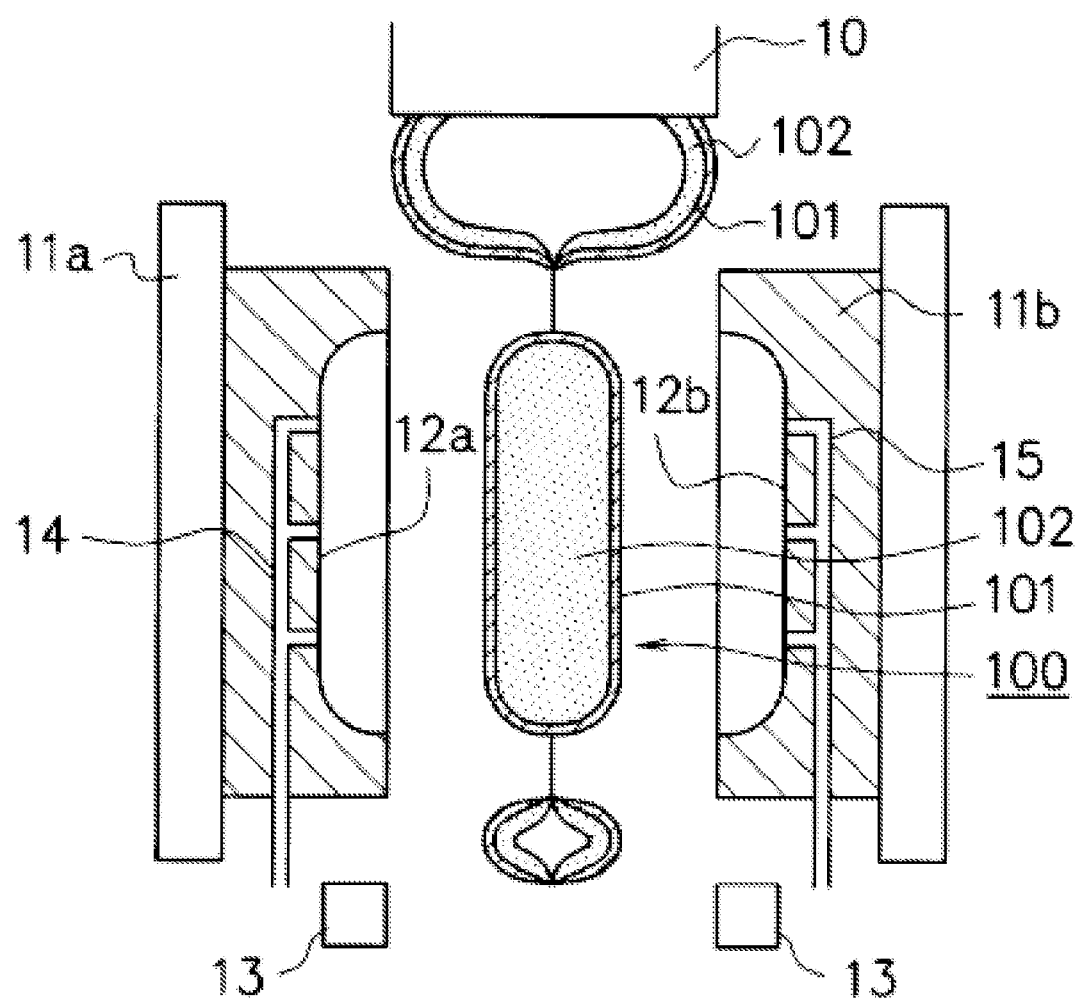
FIG. 6 is a $5^{th}$ drawing that illustrates example of method of manufacturing of multilayer foam 100 of first execution form.

When multilayer foam 100 in this execution form is manufactured, it is a multilayer resin (multilayer parison) 200 that has non-foam layer 101 outside in foam layer 102 as first shown in FIG. 2 is pushed out. Next, the inside of multilayer resin 200 is bonded mutually as shown in FIG. 3, and multilayer resin laminating body 201 is formed. Next, as shown in FIG. 4, the space between cavity side 12a, and 12b and outer side of multilayer resin laminating body 201 is empty and multilayer resin laminating body 201 is inserted in split mold 11a, 11b and mold clamping is carried out. And, multilayer resin laminating body 201 is molded in the shape along cavity side 12a and 12b as shown in FIG. 5, and multilayer foam 100 shown in FIG. 6 is molded.

Figure 13:
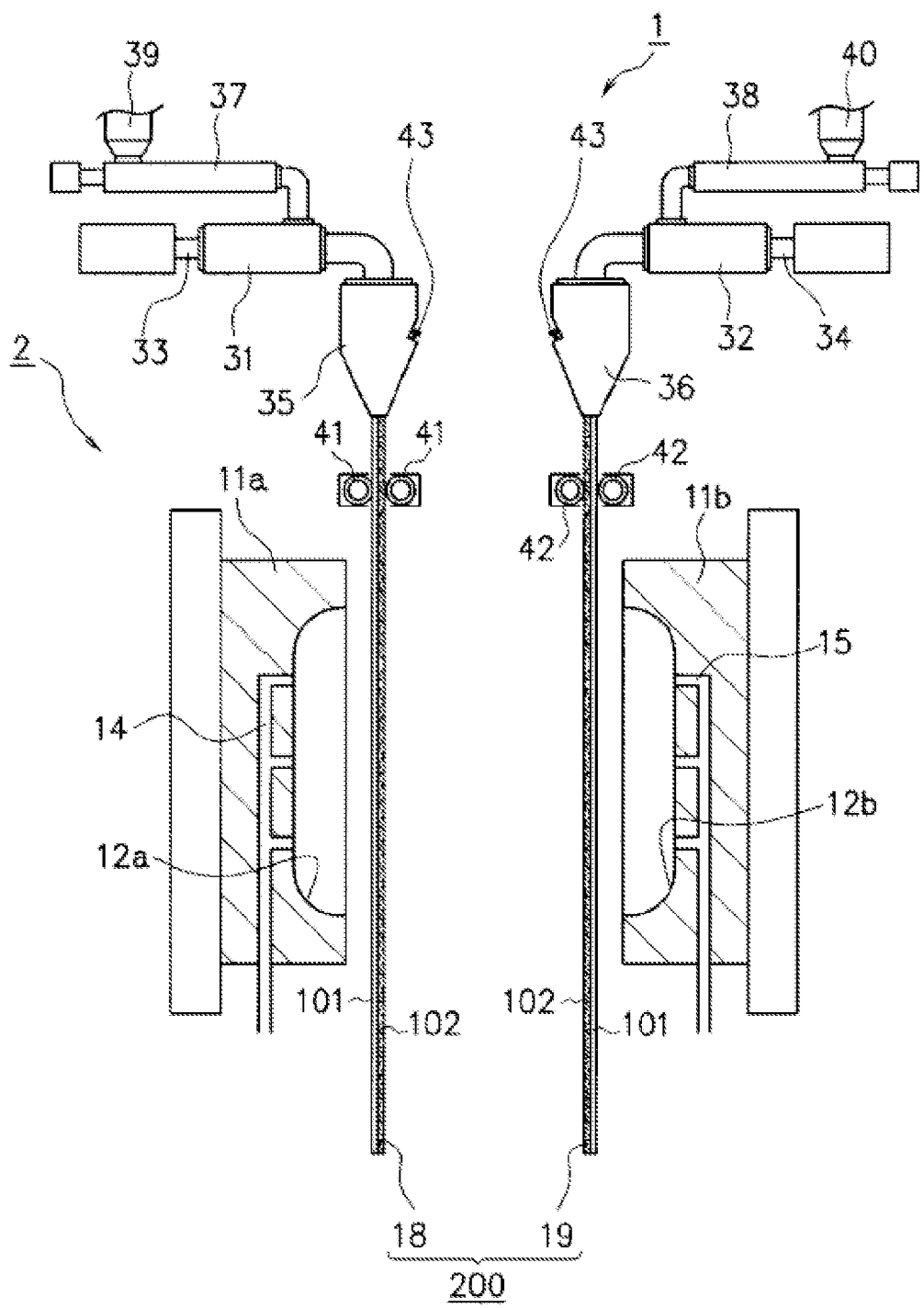
FIG. 13 illustrates the example of the method of manufacturing multilayer foam 100 in the fourth execution form.

Multilayer foam 100 is bonded with innermost side of multilayer foam 200 before clamping multilayer resin 200 in split metal mold 11a, 11b and dead air is not generated since multilayer resin laminating body 201 is formed. And, the foam magnification can be improved. In this execution form, multilayer resin 200 includes cylindrical multilayer parison 200 as shown in FIG. 2 to FIG. 6 and multilayer sheet 200 of sheet form as shown in FIG. 13. Hereafter; it explains multilayer foam 100 of this execution form in detail with reference to the accompanying drawing.

EXAMPLES

Example 1

The First Execution Form

Example of Composing Multilayer Foam 100

First of all, it explains the example of composing multilayer foam 100 in this execution form while referring to FIG. 1.

Multilayer foam 100 in this execution form is composed of non-foam layer 101 and foam layer 102.

Non-foam layer 101 composes the outside of multilayer foam 100, and foam layer 102 composes the inside of multilayer foam 100.

Multilayer foam 100 in this execution form can improve the rigidity of multilayer foam 100 because it composes the outside of non-foam layer 101. Moreover, since outside non-foam layer 101 controls foam in inside foam layer 102, foam layer 102 of the high foam magnification can be composed.

Non-foam layer 101 is composed by using well-known non-resin foam.

Foam layer 102 is composed of resin foam of independent bubble structure (The independent bubble rate is 70% or more) having two or more bubble cells and the foam magnification is 2.0 times or more. The average bubble diameter of foam cell perpendicular to foam layer 102 is below 1000 pm or below 300 ILm.

Foam layer 102 is composed of a polypropylene system resin. It composes of the blend resin to mix the hydrogen addition styrene elastomeric 5-40 wt % and 1-20 wt % of polyethylene for the system with a polypropylene system resin.

The foam magnification of the foam magnification was a value in this execution form in which the density of the thermoplastic resin used by the forming method in this execution form described later was divided by the appearance density of the wall in non-foam layer 101 and foam layer 102 of multilayer foam 100 that had been obtained by the forming method in this execution form.

Moreover, the tensile rupture expansion cuts out the wall in non-foam layer 101 and foam layer 102 of multilayer foam 100 obtained by the forming method in this execution form described later. After it is kept under −10° C., as 2 type test piece based on JIS K-7113, the value of tension rate is measured at 50 mm/minute.

As for tension elastic modulus, wall surface of foam layer 102, non-foam layer 101 of multilayer foam 100 obtained by forming method of this execution form described later is cut out and the value measured with tension rate of 50 mm/minute as the second type test piece based on JIS K-7113 at normal temperature (23° C.) is considered.

Example of Method for Manufacturing Multilayer Foam 100

Further, the manufacturing method of multilayer foam 100 of this execution form is explained with reference to FIG. 2 to FIG. 6. FIG. 2 to FIG. 6 is the FIGS. that explains manufacturing method of multilayer foam 100.

Multilayer foam 100 in this execution form is molded multilayer parison 200 composed of non-foam layer 101 and foam layer 102 is inserted in split metal mold 11a, 11b that describes multilayer parison 200.

When multilayer parison 200 is formed, each base material resin that composes non-foam layer 101 and foam layer 102 is melted and mixed in respective individual extruding machine (not shown in FIG.), it is stored temporarily in accumulation room of accumulator (not shown in FIG.), it is supplied at each constant interval (not shown in FIG.). Each base material composing non-foam layer 101 and foam layer 102 is linked up and multilayer parison 200 is formed.

Next, multilayer parison 200 is pushed out of extrusion head 10 as shown in FIG. 2, and multilayer parison 200 is arranged between division metal mold 11a and 11b. The foam layer 102 which is composed of multilayer parison 200 is produced at the time when multilayer parison 200 is pushed out of extrusion head 10.

A polyethylene resin and a polyolefin system resin etc. such as the polypropylene resins can be applied as a thermoplastic resin to compose non-foam layer 101 and foam layer 102. However, it is desirable to have the propylene unit as a thermoplastic resin that composes foam layer 102. Concretely, propylene homopolymer, and an ethylene propylene block copolymer is desirable. Since the melted tension rises, foam layer 102 can be easily made to foam and bubble foam an also be made uniformly.

Moreover, it is desirable that the propylene homopolymer that has the long chain divergence structure is a propylene homopolymer that has the weight average divergence index of 0.9 or less. The weight average divergence index is shown with v1/v2 and v2 is limiting viscosity number of linear polyolefin having mean molecular weight same as the divergence polyolefin.

Moreover, it is desirable that Melted Tension(MT) at 230° C. uses the polypropylene resin within the range of 30-350 mN for the thermoplastic resin to compose non-foam layer 101 and foam layer 102. Here, MT means melted tension. When MT of the thermoplastic resin to compose foam layer 102 is within the range of 30-350 mN, a polypropylene system resin shows the distortion stiffening, and can obtain a high foam magnification. MT uses Melt tension tester (made by the Hiroshi Azuma precision machine factory Ltd.). The strand is pushed out of the orifice of 8 mm in length by 2.095 mm in the diameter with extrusion rate of 5.7 mm/minute at afterheat temperature of 230° C. It shows the tension when it winds up to roller of 50 mm in the diameter of this strand with 100 rpm winding up speed.

1-10 of Melt Flow Rate at 230° C. is desirable for thermoplastic resin for composing non foam layer 101 and foam layer 102. Here, MFR is a value measured in order of JIS K-7210. When MFR is less than one the rise in extrusion rate becomes difficult when compared with the case when MFR is in the range of 1-10. When MFR exceeds 10, blow molding by generating draw down becomes difficult as compared to the case when MFR is in the range of 1-10.

Elastomeric that has the styrene unit where hydrogen is added to intramolecular can be applied as the styrene elastomeric to compose foam layer 102 the system. For instance, a styrene ethylene butylene styrene block copolymer, a styrene ethylene propylene styrene block copolymer, and a styrene butadiene random copolymer and hydrogen addition elastomeric etc. can be applied. The desirable mixing ratio of the styrene system elastomeric is in the range of less than 40 wt % from molded viewpoint compared with the thermoplastic resin. Moreover, the desirable content of the styrene in the styrene system elastomeric is less than 30 wt % and more desirable if less than 20 wt % from the viewpoint of shock strength at the low temperature.

Moreover, polyethylene to compose foam layer 102 can be applied when density is below 0.91 g/cm3 from viewpoint of shock strength at the low temperature. Especially, it is desirable to use the straight chain ultra low density polyethylene polymerized by a metallocene system catalyst. The composition percentage of low-density [low density] polyethylene should be below 40 wt % from viewpoint of stiffness and heat resistance for above mentioned Thermoplastic resin.

In the base material resin that composes foam layer 102, it is possible to add nucleus medicine and colorant besides blowing agent and polyethylene of low density and styrene elastomeric.

The blowing agent includes inorganic foaming agents like air, carbon dioxide, nitrogen gas, water etc. and organic system blowing agents like butane, pentane, xanthan, methylene chloride and dichloroethane etc. Blowing agent should use air carbon dioxide or nitrogen gas. In this case, the organism is not mixed, and there is no decrease in durability etc.

It is desirable to use a supercritical fluid for the foam method. Nitrogen gas or carbon dioxide should be used in supercritical state and foam of base material composing foam layer 102 should be made. In this case, it is possible to foam uniformly and surely. A supercritical fluid of nitrogen is obtained by assuming nitrogen at critical temperature of more than of 149.1° C. and critical pressure of more than 3.4 MPa.

A supercritical fluid of carbon dioxide is obtained by assuming carbon dioxide at the critical temperature of more than 31° C. and critical pressure of more than 7.4 MPa.

Next, as shown in FIG. 2, lower side of multilayer parison 200 pushed out of extrusion head 10 is closed with lower pinch 13. Multilayer parison 200 is enhanced up to a prescribed size by Preblow. As a result, the wrinkle of multilayer parison 200 can be extended. Moreover, the foam magnification of foam layer 102 where multilayer parison 200 is composed can be enlarged.

The preblow method is not especially limited, for example, it is also possible to blow the air used in preblow from extrusion head 10 in multilayer parison 200. Moreover, the blowing nozzle is inserted in multilayer parison 200 from lower pinch 13. It is also possible to blow air for preblow from lower pinch 13 side to innermost side of multilayer parison 200.

Next, split metal mold 11a and 11b are moved as shown in FIG. 3. Air blowing is performed with pressurized air from hole arranged in cavity side 12a, 12b of metal mold 11a, 11b immediately before shutting split metal mold 11a, 11b. Pressure is applied to multilayer parison 200, the inside of multilayer parison 200 is bonded mutually, and multilayer parison laminating body 201 is formed. Air of multilayer parison 200 should be sucked from at least one side of extrusion head 10 side and lower pinch 13 side. When multilayer parison laminating body 201 is formed, air in multilayer parison 200 is sucked to this. The generation of dead air in multilayer parison laminating body 201 can be controlled.

After forming multilayer parison laminating body 201 as shown in FIG. 4, As the space between cavity side 12a, and 12b and outer side of multilayer parison laminating body 201 is empty, multilayer parison laminating body 201 is inserted in split metal mold 11a and 11b and mold clamping is done. And, as shown in FIG. 5, the vacuum is sucked from hole 14 and 15 arranged in cavity side 12a and 12b of division metal mold 11a and 11b by prescribed pressure. Non-foam layer 101 where multilayer parison laminating body 201 is composed is molded in the shape along cavity side 12a and 12b. Secondary foam of foam layers 102 is made where multilayer parison laminating body 201 is composed, and the foam magnification of foam layer 102 is enlarged further. As a result, multilayer parison laminating body 201 is molded in the shape along cavity side 12a and 12b, and multilayer foam 100 of the high foam magnification can be molded.

Split metal mold 11a and 11b is mold released from multilayer foam 100. Multilayer foam 100 is taken out of split metal mold 11a and 11b.

Action and Effect of Method for Manufacturing of Multilayer Foam 100 in this Execution Form Thus, multilayer parison 200 having non-foam layer 101 outer sides in foam layer 102 as shown in FIG. 2 is pushed out between split metal mold 11a and 11b in this execution form. The fluid is sprayed on outermost side of multilayer parison 200 as shown in FIG. 3, and the innermost side of multilayer parison 200 is bonded mutually. The multilayer parison laminating body 201 is formed. After forming multilayer parison laminating body 201 as shown in FIG. 4, As the space between cavity side 12a, and 12b and outer side of multilayer parison laminating body 201 is empty, multilayer parison laminating body 201 is inserted in split metal mold 11a and 11b and mold clamping is done.

The fluid is sprayed the outside of multilayer parison 200, and the inside of multilayer parison 200 is bonded mutually before clamp molding of multilayer parison 200 in this execution form by split metal mold 11a and 11b. Since multilayer parison laminating body 201 is formed, the refuge of the air that exists in multilayer parison 200 can be secured. Therefore, when multilayer parison laminating body 201 is formed, it becomes difficult to generate dead air in multilayer parison laminating body 201. As a result of this, multilayer foam 100 where it is difficult to generate dead air can be manufactured.

The fluid is sprayed the outside of multilayer parison 200, and the inside of multilayer parison 200 is bonded mutually Multilayer parison laminating body 201 can be formed without crushing the bubble in foam layer 102 where multilayer parison 200 is composed to form multilayer parison laminating body 201. As a result, the foam magnification of multilayer foam 100 that is the final molding goods can be improved.

Example 2

The Second Execution Form

Next, it explains the second execution form.

In first execution form, the fluid is sprayed on outer side of multilayer parison 200, and the inside of multilayer parison 200 is bonded mutually. Multilayer parison laminating body 201 can be formed.

Figure 7:
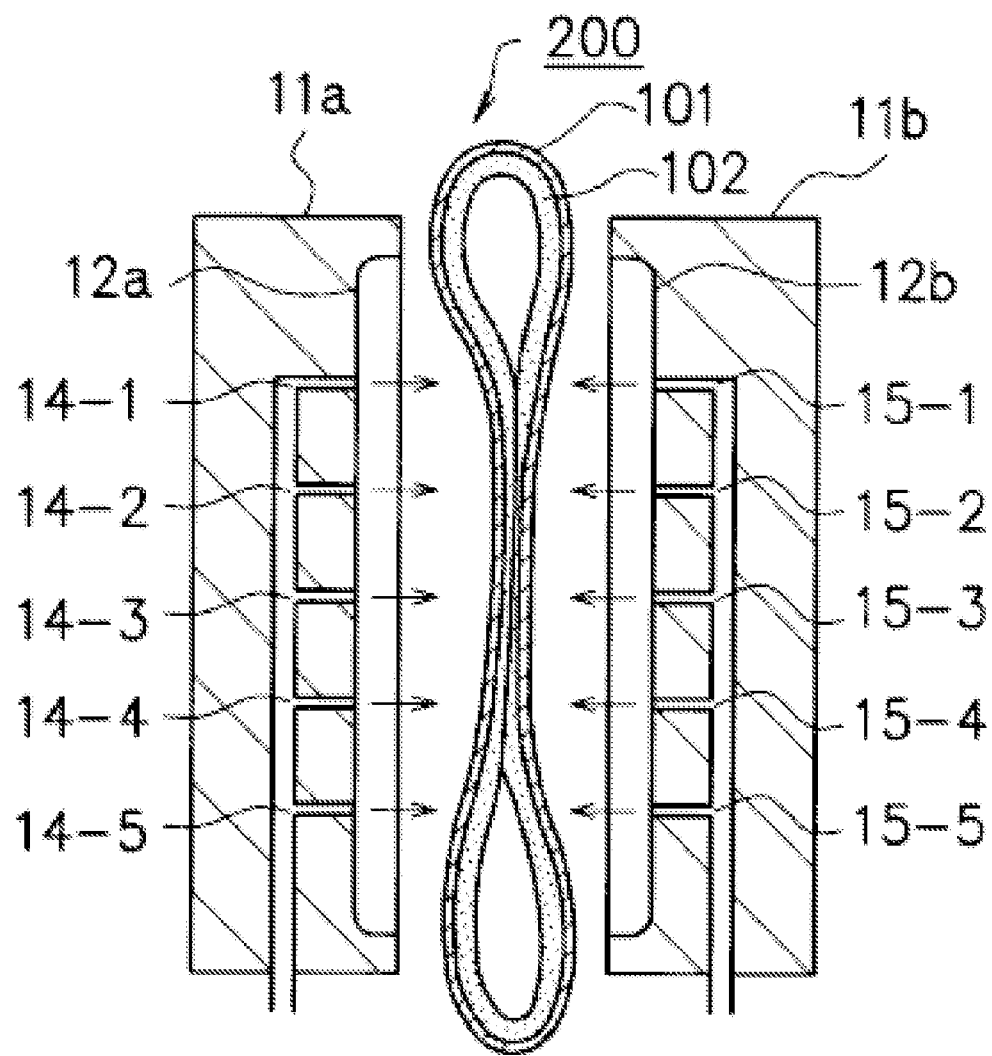
FIG. 7 is a $1^{st}$ drawing that illustrates example of method of manufacturing of multilayer foam 100 of first execution form.
Figure 8:
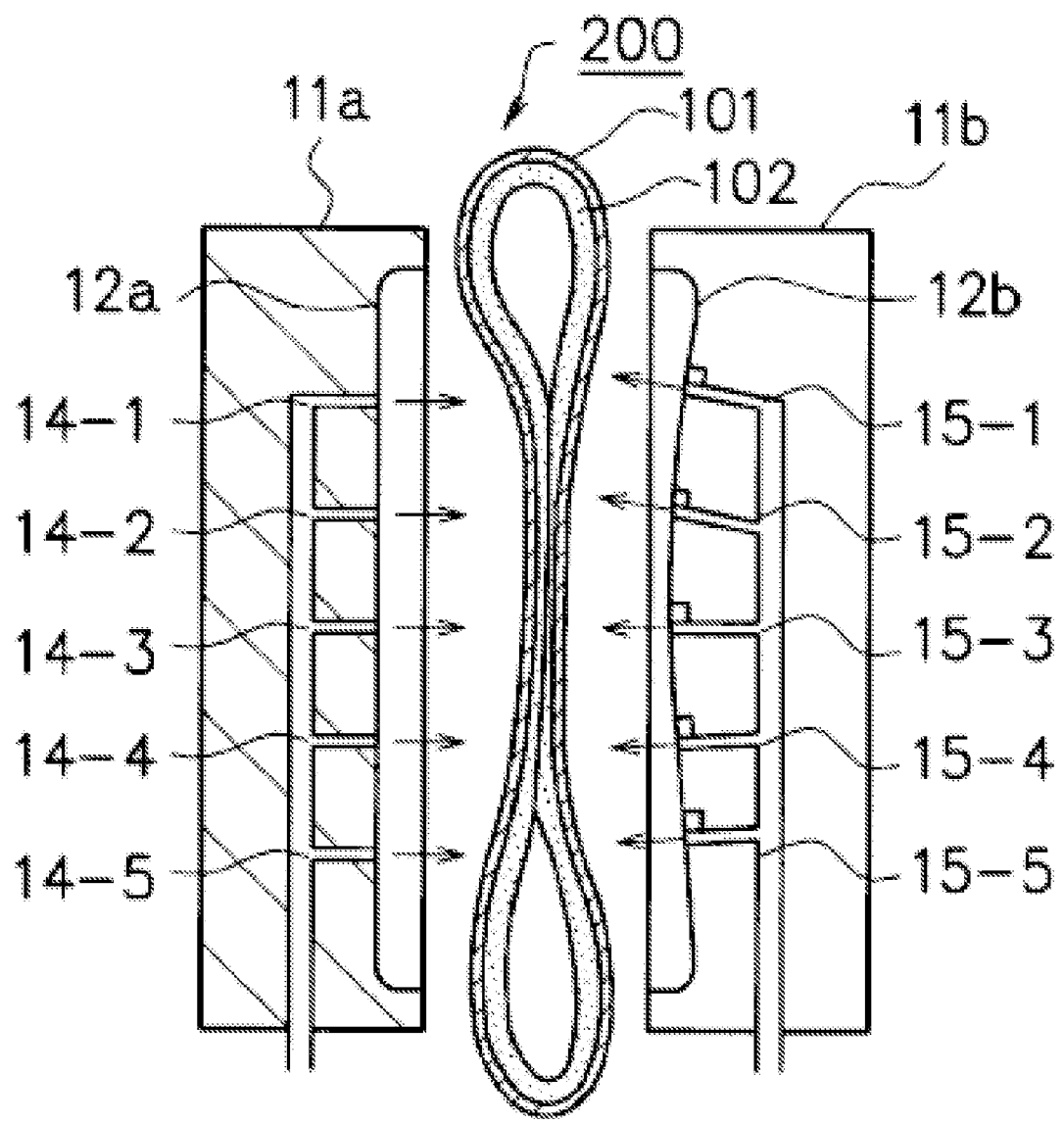
FIG. 8 is a $2^{nd}$ drawing that illustrates example of method of manufacturing of multilayer foam 100 of first execution form.

In this case, blowing in from holes 14 and 15 arranged in cavity side 12a and 12b with pressurizing air as shown in FIG. 7. Pressure is applied to multilayer parison 200, and the inside of multilayer parison 200 is bonded mutually. The multilayer parison laminating body 201 is formed. FIG. 7 shows the section when split metal mold 11a and 11b are seen from the upper surface. In FIG. 7, the case where the pressurizing air of the same pressure is added to multilayer parison 200 is indicated from each hole 14-1~14-5 and 15-1~15-5. However, it is also possible to make shape of cavity side 12b shown in FIG. 7 same as the shape of cavity side 12b shown in FIG. 8. As shown in FIG. 8, when split metal mold 11a, 11b is clamped, The interval in the center part of a pair of cavity side 12a and 12b (part that corresponds to holes 14-3 and 15-3) is of cavity side 12b is formed in small shape than the intervals in the edge of a pair of cavity side 12a and 12b (for instance, part that corresponds to holes 14-1 and 15-1, holes 14-5, and 15-5). When the pressurizing air of the same pressure is added from each hole 14-1-14-5 and 15-1-15-5 to multilayer parison 200, it is made easily to flow to edge (for instance, part that corresponds to hole 14-1, 15-1, and hole 14-5 and 15-5) side of multilayer parison 200 in air in multilayer parison 200. As a result, generation of dead air in the center part (part that corresponds to holes 14-3 and 15-3) of multilayer parison 200 becomes difficult. FIG. 8 and FIG. 7 shows the section where split metal mold 11a and 11b were seen from the upper surface.

Moreover, in first execution form, as shown in FIG. 3, blowing is performed by pressurizing air from holes 14, 15 arranged in cavity side 12a, 12b. It was decided to apply the pressure to multilayer parison 200, and to bond the inside of multilayer parison 200 mutually, and to form multilayer parison laminating body 201.

Figure 9:
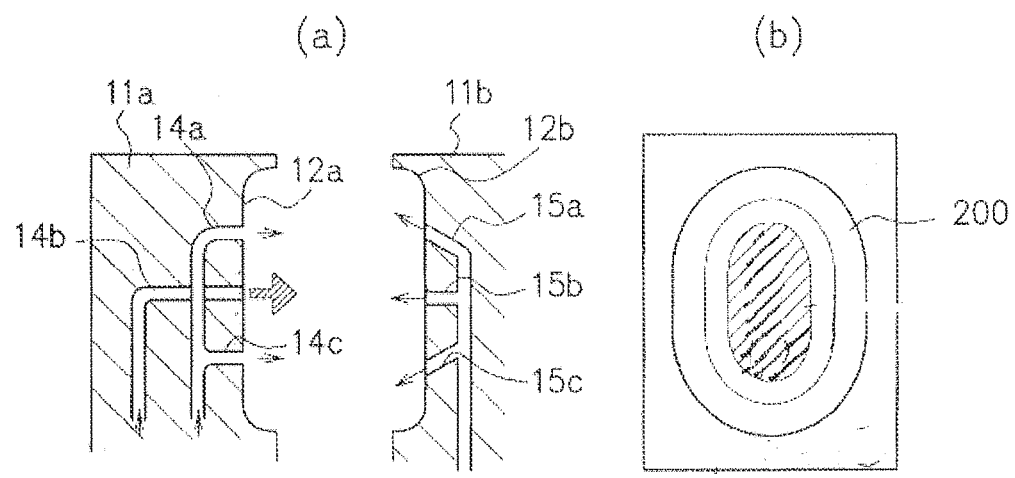
FIG. 9 is a $3^{rd}$ drawing that illustrates example of method of manufacturing of multilayer foam 100 of first execution form.

However, as shown in FIG. 9(a), it is composed to add pressurizing air of pressure different from each hole 14a, 14b, and 14C arranged on cavity side 12a to multilayer parison 200. When the pressurizing air of different pressure from each hole 14a-14c and 15a-15c is added to multilayer parison 200, As shown in FIG. 9(b), the pressure of pressurizing air accepted in the center part (part that corresponds to hole 14b and 15b) of multilayer parison 200 can be made more than the pressure pressurizing air accepted in upper and lower part (part that corresponds to hole 14a, 15a and hole 14C, 15C) of multilayer parison 200. As a result, generation of dead air becomes difficult in the center part of multilayer parison 200 to make easy flow to the vertical direction of multilayer parison 200 in air in multilayer parison 200. At the composition of FIG. 9(a), the pressure of the pressurizing air added from hole 14b arranged on cavity side 12a to multilayer parison 200 is strengthened. The pressure of the pressurizing air added from hole 14a and 14C to multilayer parison 200 is weakened.

Figure 10:
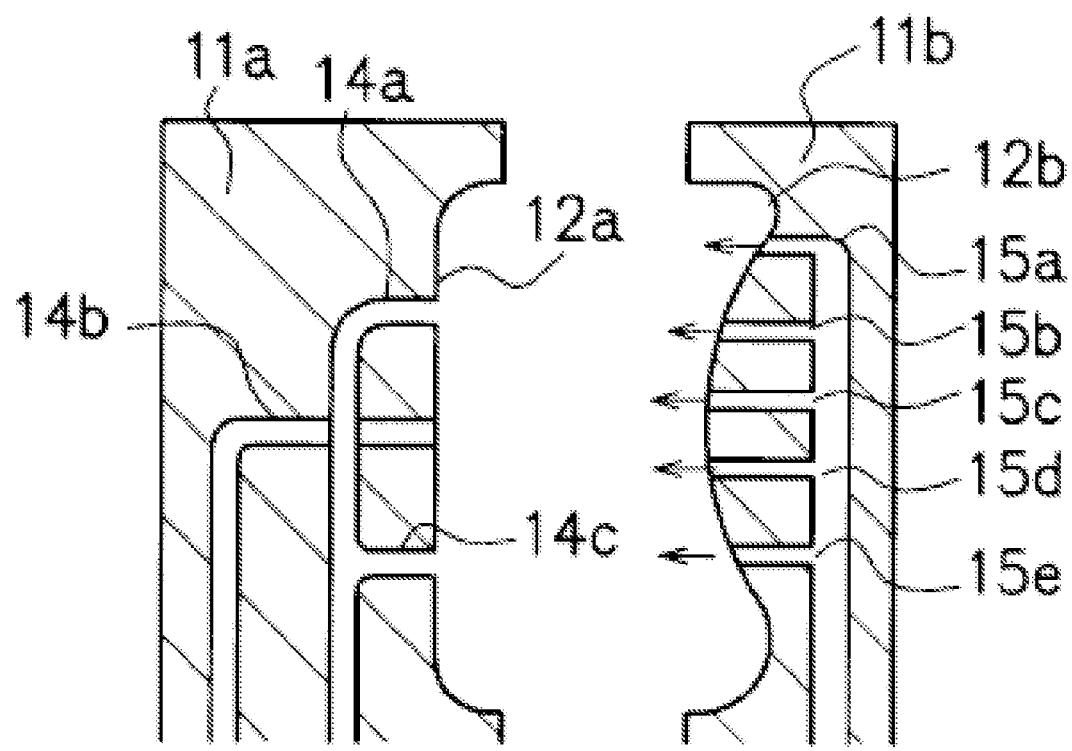
FIG. 10 is a $4^{th}$ drawing that illustrates example of method of manufacturing of multilayer foam 100 of first execution form.

In FIG. 9(a), the direction of the pressurizing air that blows in from hole 15b arranged on cavity side 12b to multilayer parison 200 and the direction of the pressurizing air that blows in from hole 15a and 15C to multilayer parison 200 are different. Easy flow in the vertical direction of multilayer parison 200 in air in multilayer parison 200 is made. However, as shown in FIG. 10, when split metal mold 11a, 11b are clamped, Shape on cavity side 12b is formed in the same direction of pressurizing air that blows in multilayer parison 200 from holes 15a~15e. And the shape of interval in the center part of a pair of cavity side 12a and 12b (part that corresponds to hole 15C) is made small than the intervals in the edge of a pair of cavity side 12a and 12b (part that corresponds to hole 15a and hole 15e). It is also possible to make easy flow of multilayer parison 200 in the direction of top and bottom of multilayer parison 200(for instance, part that corresponds to hole 15a and hole 15e) when the pressurizing air of the same pressure is added to multilayer parison 200 from each hole 15a-15e. As a result, since air in multilayer parison 200 can easily flow in the vertical direction of multilayer parison 200, it is difficult to generate dead air in the center part of multilayer parison 200.

Figure 11:
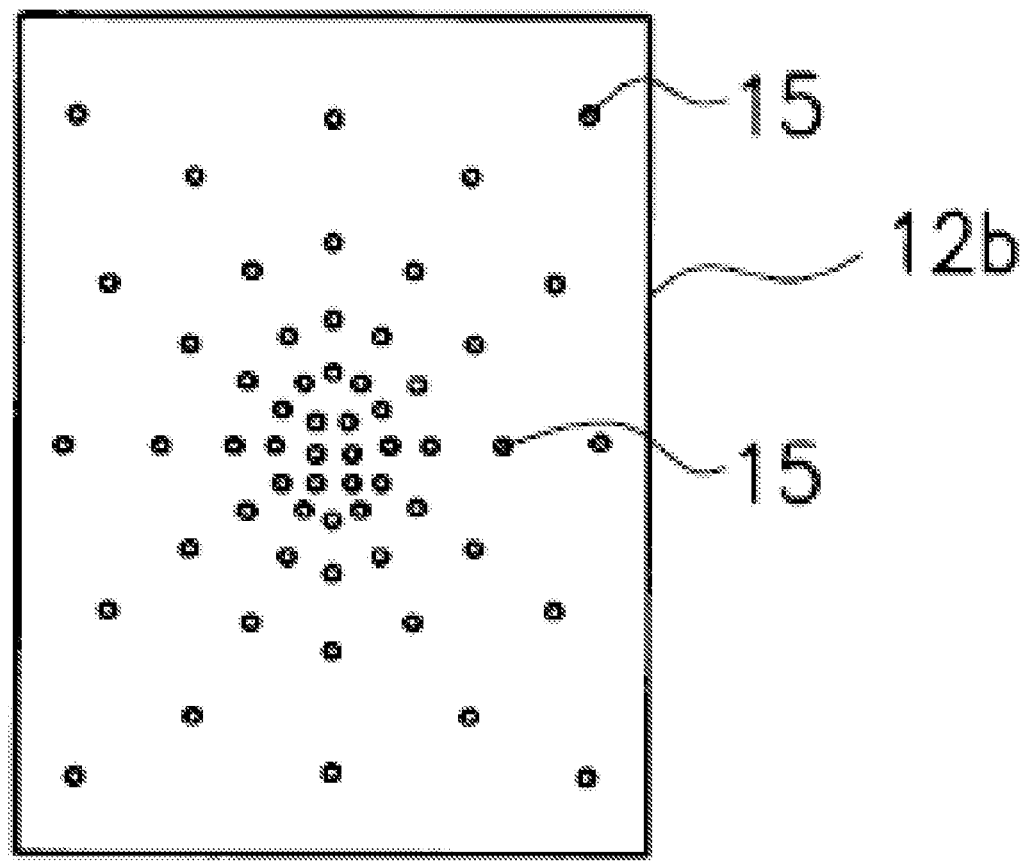
FIG. 11 is a $5^{th}$ drawing that illustrates example of method of manufacturing of multilayer foam 100 of first execution form.

Moreover, as shown in FIG. 11, a lot of holes 15 are formed in the center part on cavity side 12b, and the formation density of hole 15 in the center part is enlarged. Small hole 15 is formed at the edge on cavity side 12b. The formation density of hole 15 at the edge is reduced. When you add the pressurizing air of the same pressure from each hole 15 to multilayer parison 200 as shown in FIG. 11. As shown in FIG. 9(b), it is also possible to make the pressure of the pressurizing air accepted in the center part of multilayer parison 200 grow more than the pressure of the pressurizing air accepted at the edge of multilayer parison 200. That is, as shown in FIG. 9(b), if it is possible to make the pressure of the pressurizing air accepted in the center part of multilayer parison 200 grow more than the pressure of the pressurizing air accepted at the edge of multilayer parison 200, the technique doesn't have any special limitations, and for example mechanical method can be used as shown in FIG. 9(a), and a structural method as shown in FIG. 11 be used.

Thus, in this execution form, as shown in FIG. 8, the shape of cavity side 12b is composed with the smaller shape where the interval in the center part of a pair of cavity side 12a and 12b (part that corresponds to hole 14-3 and 15-3) is smaller than the interval at the edge of a pair of cavity side 12a, 12b (for instance, part that corresponds to holes 14-1 and 15-1, holes 14-5, and 15-5). When the pressurizing air of the same pressure from each hole 14-1-14-5, 15-1-15-5 is added to multilayer parison 200, it is composed for easy flow of air in multilayer parison 200 to the edge (for instance, part that corresponds to hole 14-1, 15-1, and hole 14-5 and 15-5) side of multilayer parison 200.

It composes so that the pressure of the pressurizing air accepted in the center part of multilayer parison 200 may grow more than the pressure of the pressurizing air accepted at the edge of multilayer parison 200.

As a result, air in multilayer parison 200 flows to the edge side of multilayer parison 200, and generation of dead air becomes difficult in the center part of multilayer parison 200

Example 3

The Third Execution Form

Next, it explains the third execution form.

In the first and second execution form, the fluid is sprayed the outside of multilayer parison 200, and the inside of multilayer parison 200 is bonded mutually. Multilayer parison laminating body 201 is formed.

Figure 12:
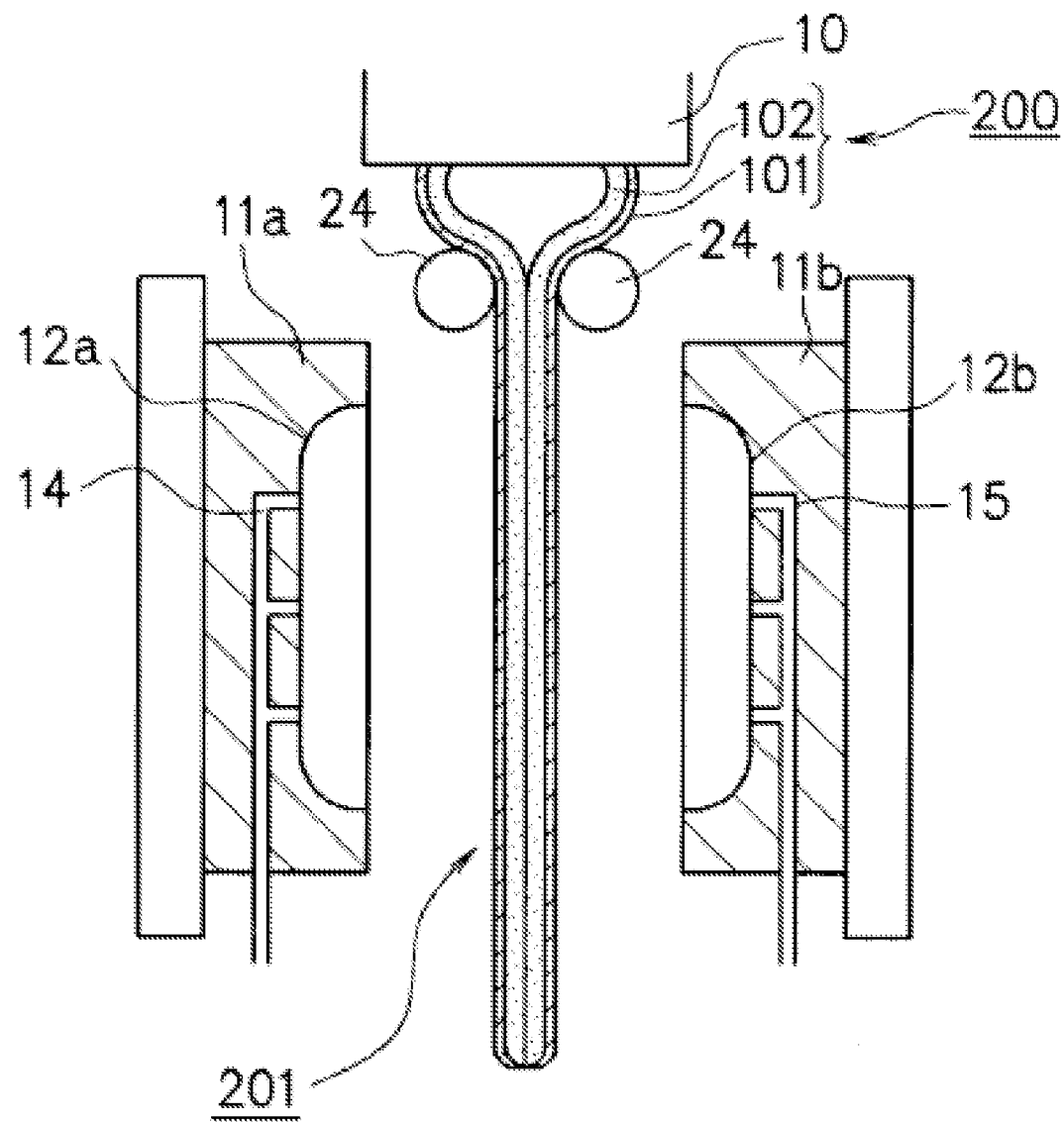
FIG. 12 illustrates the example of the method of manufacturing multilayer foam 100 in the third execution form.

In the third execution form, as shown in FIG. 12, the inside of multilayer parison 200 is bonded mutually by using pressure roller 24, and multilayer parison laminating body 201 is formed. As a result, multilayer parison laminating body 201 without dead air similar to first and second execution form can be formed. Hereafter, it explains the third execution form while referring to FIG. 12.

Example of Method for Manufacturing of Multilayer Foam 100

First of all, it explains the example of the method of manufacturing multilayer foam 100 in this execution form while referring to FIG. 12. FIG. 12 is FIG. where the example of the method of manufacturing multilayer foam 100 is shown.

In this execution form, multilayer parison 200 pushed out from extrusion head 10 is inserted between a pair of pressure roller 24. The inside of multilayer parison 200 is bonded mutually. Multilayer parison laminating body 201 is formed.

In this execution form, multilayer parison 200 is inserted between a pair of pressure roller 24; it is possible to stick the inside of multilayer parison 200 continuously mutually with a wide area. And, the thickness of multilayer parison laminating body 201 can be made constant.

For preventing the decrease in the foam magnification of multilayer foam 100 that becomes the final molding goods, the pressure of pressure roller 24 when multilayer parison 200 is inserted in pressure roller 24 should be the pressure where the bubble of foam layer 102 of multilayer parison 200 is not crushed as much as possible and more precisely it should be less than 1 $kg/cm^2$. Since the bubble in foam layer 102 doesn't collapse easily even if multilayer parison 200 is inserted in pressure roller 24, molding multilayer foam 100 that becomes the final molding goods can be improved. Moreover, it is desirable to do pre blow to multilayer parison 200 before multilayer parison laminating body 201 is formed with pressure roller 24 to prevent the wrinkle being generated on the surface of multilayer parison laminating body 201 when multilayer parison laminating body 201 with pressure roller 24 is formed. In this case, air for pre blow will be blown in from the extrusion head 10 side to the inside of multilayer parison 200.

Moreover, when multilayer parison laminating body 201 with pressure roller 24 is formed, it is desirable to suck air from the extrusion head 10 in multilayer parison 200. As a result, dead air can be prevented being generated in the part where the inside of multilayer parison 200 bonds mutually. However, air for preblow is blown in from the extrusion head 10 side to the inside of multilayer parison 200. And, when air in multilayer parison 200 is sucked, it is necessary to change blowing process and the sucking process dynamically.

After multilayer parison laminating body 201 is formed with Pre blow 24, the multilayer parison laminating body 201 is transported between division metal mold 11a and 11b. As well as the first execution form. As the space between cavity side 12a, 12b and multilayer parison laminating body 201 outer side of multilayer parison laminating body 201 is empty, multilayer parison laminating body 201 is inserted in split metal mold 11a, 11b and it is clamped. After that, the vacuum is sucked from holes 14 and 15 arranged in cavity side 12a of split metal mold 11a and 11b and 12b by prescribed pressure. Secondary foaming of foam layer composing multilayer parison laminating body 201 is performed while molding non foaming layer 101 composed of multilayer parison laminating body 201 is molded along cavity side 12a, 12b. The foam magnification of foam layer 102 is enlarged. As a result, multilayer parison laminating body 201 is molded in the shape along cavity side 12a and 12b and multilayer foam 100 of the high foam magnification can be molded.

Next, division metal mold 11a and 11b are made to retreat. Split metal mold 11a, 11b is released from multilayer foam 100 and Multilayer foam 100 is taken out of split metal mold 11a and 11b.

Action and Effect of Method for Manufacturing of Multilayer Foam 100 in this Execution Form Thus, in this execution form as shown in FIG. 12, multilayer parison 200 that has non-foam layer 101 outside in foam layer 102 is inserted between a pair of pressure roller 24 and the inside of multilayer parison 200 is bonded mutually, and multilayer parison laminating body 201 is formed.

The inner side of multilayer parison 200 that uses a pair of pressure roller 24 is bonded before clamping multilayer parison 200 with split metal mold 11a, 11b. Since multilayer parison laminating body 201 can be formed, when multilayer parison laminating body 201 is formed, it becomes possible to make difficult the generation of dead air inside multilayer parison laminating body 201. As a result, multilayer foam 100 where dead air is not generated easily can be manufactured.

Example 4

The Fourth Execution Form

Next, it explains the fourth execution form.

In the first-third execution form mentioned above, multilayer foam 100 is molded by using cylinder multilayer parison 200. The molding of multilayer foam 100 by using two or more cylindrical multilayer sheets 200 in molten states is also possible in first-third execution form. Hereafter, it explains multilayer foam 100 of this execution form while referring to FIG. 13.

Example of Method for Manufacturing Multilayer Foam 100

First of all, it explains the example of the method of manufacturing multilayer foam 100 in this execution form while referring to FIG. 13. FIG. 13 is FIG. where the example of composing the molding device with which multilayer foam 100 in this execution form is molded is shown.

Molding device to mold multilayer foam 100 in this execution form composes extrusion device 1 and mold clamping device 2. Thermoplastic resin sheet 18 and 19 of molten state are pushed out from extrusion device 1 to mold clamping device 2. Thermoplastic resin sheet 18 and 19 is clamped with mold clamping device 2. Multilayer foam 100 shown in FIG. 1 is molded. The first thermoplastic resin sheet 18 composes the outside of non-foam layer 101, and composes the inside of foam layer 102. Moreover, the second thermoplastic resin sheet 19 composes the outside of non-foam layer 101, and composes the inside of foam layer 102.

Extrusion device 1 is composed of first accumulator 31, second accumulator 32, first Plunger 33, second Plunger 34, first T die 35, second T die 36, first Extruding machine 37, second extruding machine 38, first thermoplastic resin feed hopper 39, second thermoplastic resin feed hopper 40, first pair of roller, and second pair of roller 42.

Clamping device 2 composes split metal mold 11a and 11b. Split metal mold 11a and 11b composes cavity 12a 12b.

First of all, as shown in FIG. 13, thermoplastic resin sheet 18 to compose other non-foam layer 101 and foam layer 102 is pushed out of the first T die 35. First thermoplastic resin sheet 18 is hanged down between a pair of division metal mold 11a and 11b. The first thermoplastic resin sheet 18 composes the outside of non-foam layer 101, and composes the inside of foam layer 102.

Moreover, as shown in FIG. 13, Thermoplastic resin sheet 19 for composing the other non-foam layer 101 and foam layer 102 is pushed out of the 2nd T Die 36. Second thermoplastic resin sheet 19 is hanged down between a pair of division metal mold 11a and 11b. The second thermoplastic resin sheet 19 composes the outside of non-foam layer 101, and composes the inside of foam layer 102. As a result, multilayer sheet 200 composed of the first thermoplastic resin sheet 18 and the second thermoplastic resin sheet 19 is formed.

It is necessary to individually adjust the thickness distribution of extrusion direction, extrusion rate, resin sheet of thermoplastic resin sheet 18 and 19 suspended between a pair of split metal mold 11a, 11b for preventing the generation of difference of thickness by drawdown and neck in, etc.

First thermoplastic resin sheet 18 is melted mixture of each base material resin that composes non-foam layer 101 and foam layer 102 in the first individual respective extrusion machine 37. It is temporarily stored in accumulation chamber of the first accumulator 31. It is supplied with 1st T Die 35 by the 1st plunger 33 at constant intervals. Each base material resin that composes non-foam layer 101 and foam layer 102 is joined with 1st T Die 35, and it composes the outside is composed of non-foam layer 101. The first thermoplastic resin sheet 18 where the inner side is composed of foam layer 102 is formed.

Second thermoplastic resin sheet 19 is melted mixture of each base material resin that composes non-foam layer 101 and foam layer 102 in the second individual respective extrusion machine 38. It is temporarily stored in accumulation chamber of second accumulator 32. It is supplied with second T Die 35 by the second plunger 34 at constant intervals. Each base material resin that composes non-foam layer 101 and foam layer 102 is joined with second T Die 35, and it composes the outside is composed of non-foam layer 101. The second thermoplastic resin sheet 19 where the inner side is composed of foam layer 102 is formed.

First thermoplastic resin sheet 18 pushed out by first die 35 is arranged between a pair of split metal mold 11a, 11b where clamping pressure is given by first pair of roller 41. Second thermoplastic resin sheet 18 pushed out by second die 35 is arranged between a pair of split metal mold 11a, 11b where clamping pressure is given by second pair of roller 42. At this time, thickness and thickness distribution of first thermoplastic resin sheet 18 and second thermoplastic resin sheet 19 is adjusted individually.

The thermoplastic resin supplied to first T die 35 and second T die 36 respectively is pushed out as resin sheet from slit through resin flow channel from manifold of main body of each T die not shown in FIG. The main body of each T Die overlaps and composes other Die and another Die. Other die lips and the other die lips have the slit space in the tip of the main body of each T Die in opposite direction. The interval of the slit space is set with slit space adjustment device 43.

Though the thickness of resin sheet pushed out from first T die 35 and second T die 36 is decided as per slit space, this slit space is adjusted uniformly in width direction of resin sheet according to well-known slit space adjustment device 43. In addition, the other die lips between extrusion start up of intermittent resin sheet pushed out to extrusion end of resin sheet are changed by slit space drive device not shown in FIG. The thickness of extrusion direction of the resin sheet will be adjusted.

There is a heat expansion type or a machine type as slit space adjustment device 43, and it is desirable to have device with both the functions. Two or more slit space adjustment devices 43 are arranged at equal intervals along the direction of width of the slit. The thickness of the resin sheet in the direction of width can be made uniform by each narrowing, and widening the slit space with each slit space adjustment device 43.

Resin sheet pushed out from T die 36 of first T die and second T die is adjusted in a state suspended between a pair of split metal mold 11a, 11b in other words, it is adjusted so that the thickness of extrusion direction in clamping time. In this case, the slit space is gradually expanded from extrusion start up of resin sheet, and it is changed for the maximum at extrusion end of resin sheet.

As a result, though the thickness of the resin sheet pushed out of first T die 35 and Second T die 36 gradually becomes thick from starting of extrusion of resin sheet, it can be adjusted to uniform thickness throughout upward to downward of resin sheet. The resin sheet pushed out in the molten state gradually becomes thinner from lower side to upper side of enlarged resin sheet. The slit space is set off with the expanded thickened pushed out amount and enlarged thinner amount by draw down phenomenon.

After suspending thermoplastic resin sheet 18 and 19 between a pair of split metal mold 11a and 11b, and forming multilayer sheet 200, split metal mold 11a and 11b are moved as shown in FIG. 3 like the first execution form. Blowing in from holes 14 and 15 arranged in cavity side 12a and 12b of division metal mold 11a and 11b is carried out immediately before shutting division metal mold 11a and 11b mutually with pressurizing air. Pressure is applied to multilayer sheet 200 composed of the first thermoplastic resin sheet 18 and the second thermoplastic resin sheet 19. The inside in multilayer sheet 200 is bonded mutually, and multilayer sheet laminating body 201 is formed.

After forming multilayer sheet laminating body 201, as shown in FIG. 4, multilayer sheet laminating body 201 is inserted and clamped between the empty space of outermost side of multilayer sheet laminating body 201 and cavity side 12a, 12b with split metal mold 11a, 11b. And, as shown in FIG. 5, the vacuum is sucked from hole 14 arranged in cavity side 12a and 12b of split metal mold 11a and 11b and 15 by prescribed pressure. Non-foam layer 101 where multilayer sheet laminating body 201 is composed is molded in the shape along cavity side 12a and 12b. Secondary foaming of foaming layer 102 composing multilayer sheet laminating body 201 is carried out and the foam magnification of foam layer 102 is enlarged further. As a result, multilayer sheet laminating body 201 is molded in the shape along cavity side 12a and 12b, and multilayer foam 100 of the high foam magnification can be molded.

Next, split metal mold 11a and 11b are backed up as shown in FIG. 6. Split metal mold 11a, 11b is released from multilayer foam 100. Multilayer foam 100 is taken out of split metal mold 11a and 11b.

Action and effect of method for Manufacturing Multilayer Foam 100 in this Execution Form Thus, in this execution form as shown in FIG. 13, multilayer sheet 200 that has non-foam layer 101 outside foam layer 102 is pushed out between division metal mold 11a and 11b. As shown in FIG. 3 same as first execution form, fluids are sprayed outermost side of multilayer sheet 200 and the innermost side of multilayer sheet 200 is bonded mutually. Multilayer sheet laminating body 201 is formed. And, as shown in FIG. 4, multilayer sheet laminating body 201 is inserted and clamped between the empty space of outermost side of multilayer sheet laminating body 201 and cavity side 12a, 12b with split metal mold 11a, 11b. As shown in FIG. 5, multilayer sheet laminating body 201 is molded in the shape along cavity side 12a and 12b and multilayer foam 100 of the high foam magnification is molded.

In this execution form, before clamping multilayer sheet 200 with split metal mold 11a and 11b, fluids are sprayed in outermost side of multilayer sheet 200, and the innermost side of multilayer sheet 200 is bonded mutually. The refuge of the air that exists in multilayer sheet 200 can be secured to form multilayer sheet laminating body 201. Therefore, when multilayer sheet laminating body 201 is formed, it becomes difficult to generate dead air in multilayer sheet laminating body 201. As a result, multilayer foam 100 where dead air is not generated easily can be manufactured.

Moreover, in this execution form, the fluids are sprayed in outermost side of multilayer sheet 200, and the innermost side of multilayer sheet 200 is bonded mutually. Multilayer sheet laminating body 201 can be formed without crushing the bubble in foam layer 102 where multilayer sheet 200 is composed to form multilayer sheet laminating body 201. As a result, the foam magnification of multilayer foam 100 that is the final molding goods can be improved.

In the execution form mentioned above, clamping is done by using thermoplastic resin sheet in the molten state. When a suitable molding method where multilayer foam 100 was molded was used was explained. However, there are no restrictions to the forming method explained in the above-mentioned execution form. For instance, it is also possible to mold by applying the forming method (Solid board sheet is reheated and blowing method of reheated sheet and molding method multilayer foam 100) indicated in Open disclosure no. 2009-233960 official gazette etc.

Example 5

Fifth Execution Form

Next, it explains the fifth execution form.

In first-fourth execution form, multilayer foam 100 composing non-foam layer 101, foam layer 102 is formed.

The fifth execution form arranges epidermal material 103 in division metal mold 11a and 11b, and molds multilayer foam 100 that has epidermal material 103. Hereafter, multilayer foam 100 of this execution form is explained in detail while referring to FIG. 14-FIG. 17.

Figure 14:
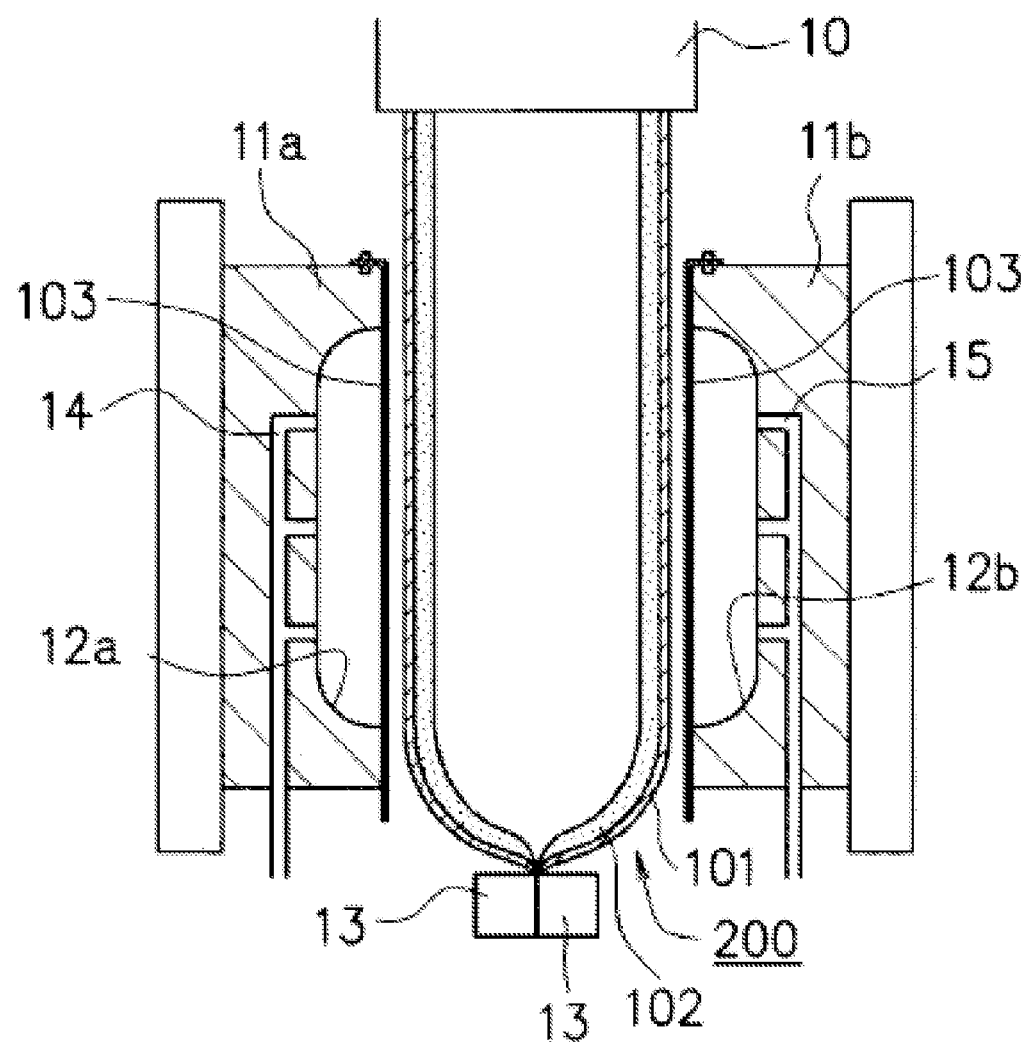
FIG. 14 is a $1^{st}$ drawing that illustrates the example of the method of manufacturing multilayer foam 100 in the fifth execution form.

In this execution form, epidermal material 103 is arranged between split metal mold 11a, 11b, and multilayer parison 200 as shown in FIG. 14, and multilayer foam 100 that has epidermal material 103 is molded.

Epidermal materials 103 are the fiber sheets such as knitting, cloths, and unwoven cloths obtained by processing blend fibers and synthetic fiber like nylons, polyesters, acrylic fibers, vinylon, polypropylenes, and polyurethanes and semi synthetic fiber like acetate, and rayon, regenerated fibers such as viscose rayon and the cuprammonium rayon, natural fabrics like wool, cotton etc. Epidermal material 103 is suitable for designing wool sheared fabric and raising fabric having fuzz of raising state for vertical other direction against stretching direction of fabric. Epidermal material 103 is also applicable even if fuzz is not contained. Moreover, it is also possible to make the resin sheets made of thermoplastic resins such as the vinyl chloride, polyethylene, polypropylenes, and polyurethanes. The resin sheet can accumulate well-known supporting material, expanded sheet, fiber sheet such as unwoven cloths for improvement of sticking strength of epidermal material 103, and multilayer parison 200, etc. and the prevention of air collection between cushioning properties, epidermal material 103, and multilayer parison 200, etc. The unwoven cloth having scale plate weight of more than 100 $g/m^2$ of synthetic material that consists of polyester, the polypropylene or the polyamide is desirable from molding point of view.

Though the epidermal material 103 is stuck on the surface side and the back side of multilayer foam 100 mainly on the surface side. It is possible to cover with epidermal material 103 over all aspects to never expose multilayer foam 100 by installing epidermal material 103 in both the surface side and the back side.

Reinforced sheet with bending degree of elasticity is more than 21000 $kg/cm^2$ and thickness less than 1.0 mm or bonded material with breaking strength of more than 90 $kg/m^2$ can be assumed Epidermal material 103 stuck on reverse side.

The fiber reinforcement sheet etc. that consist of the reinforced resin sheet or the glass fiber and carbon fiber, etc. that add an inorganic, reinforced materials of the glass fiber and the talc, etc. are suitable as the reinforcement sheet.

When the blow is molded, a required temperature to stick epidermal material 103 to multilayer parison 200 is the necessary temperature for eyes of the fiber such as unwoven cloths so that integrated may stick by the entering anchor effect. Multilayer parison 200 in the molten state comes in contact with epidermal material 103 arranged between split metal mold 11a and 11b. The liquidity of multilayer parison 200 decreases when the temperature of multilayer parison 200 is low, sticking strength with epidermal material 103 decreases, and the problem such as peeling off will be caused. The temperature required to stick Epidermal material 103 on one object should be as follows. The temperature of extruding as molten state generally in polyolefin system resin or the temperature when preformed molded resin sheet is overheated and melted should be more than 185° C. preferably more than 190° C.

Example of Method for Manufacturing Multilayer Foam 100

Next, example of the method of manufacturing multilayer foam 100 in this execution form is explained while referring to FIG. 14 to FIG. 17. FIG. 14 to FIG. 17 shows the example of the method of manufacturing multilayer foam 100.

First of all, epidermal material 103 is arranged between split metal mold 11a, 11b, and multilayer parison 200 as shown in FIG. 14. When epidermal material 103 composes of the material without the permeability, only the part side on epidermal material 103 is installed in with split metal mold 11a and 11b as shown in FIG. 14.

Next, as shown in FIG. 14, Multilayer parison 200 is pushed out of extrusion head 10, and multilayer parison 200 is arranged between split metal mold 11a and 11b. And, a lower side of multilayer parison 200 pushed out of extrusion head 10 is closed with lower pinch 13. Multilayer parison 200 is enhanced up to a prescribed size by preblow.

Figure 15:
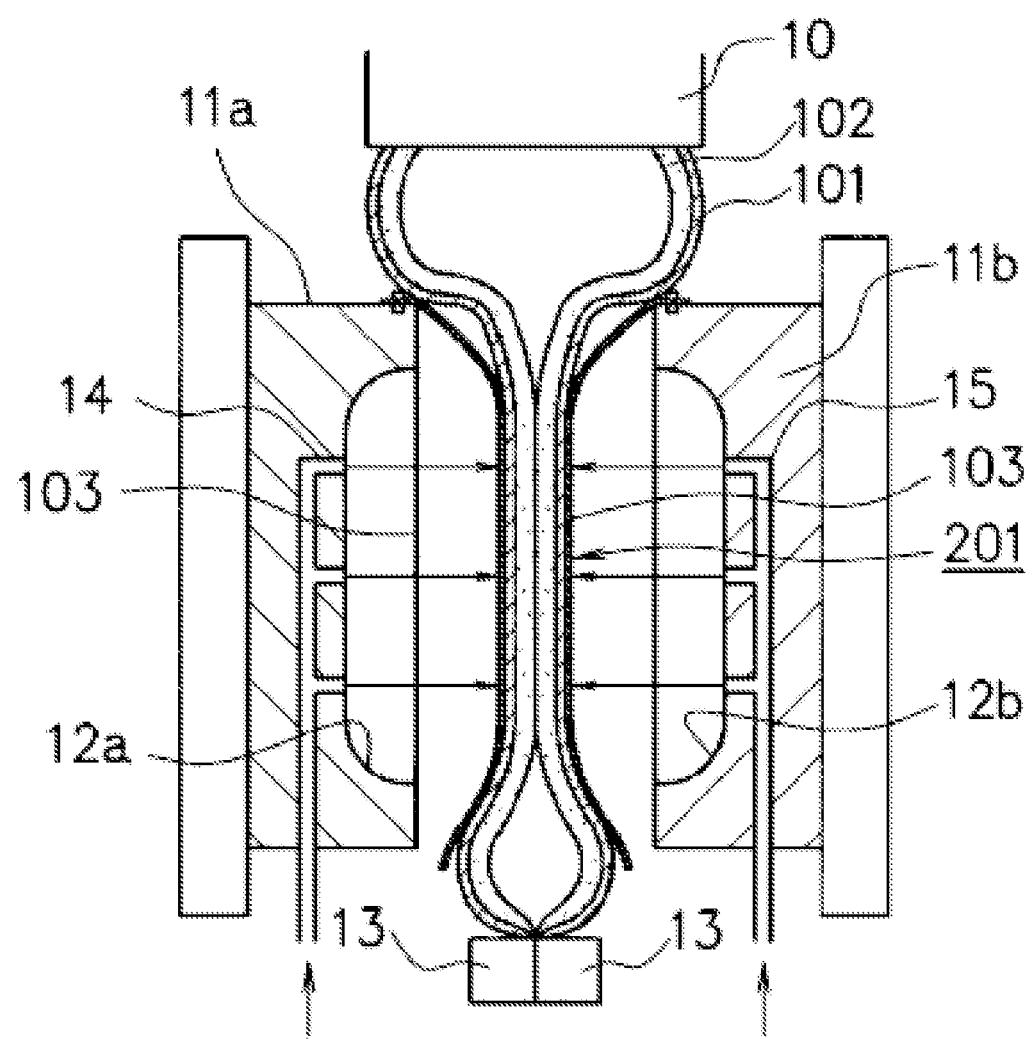
FIG. 15 is a $2^{nd}$ drawing that illustrates example of method of manufacturing of multilayer foam 100 of fifth execution form.

Next, as shown in FIG. 15, split metal mold 11a and 11b are moved. Blowing in from holes 14 and 15 arranged in cavity side 12a and 12b of split metal mold 11a and 11b is performed immediately before shutting split metal mold 11a and 11b mutually with pressurizing air. Pressure is applied to multilayer parison 200 and epidermal material 103. The outermost side of epidermal material 103 and multilayer parison 200 is bonded, and the innermost side of multilayer parison 200 is bonded mutually. Multilayer parison laminating material 201 that has epidermal material 103 is formed. Epidermal material 103 will accept the pressure of the pressurizing air to epidermal material 103 in this execution form when blowing in from hole 14 and 15 with the pressurizing air is performed since it composes the material without the permeability. Therefore, epidermal material 103 is bonded with outermost side of multilayer parison 200 with the pressure of the pressurizing air, and the innermost side of multilayer parison 200 will be bonded mutually.

Figure 16:
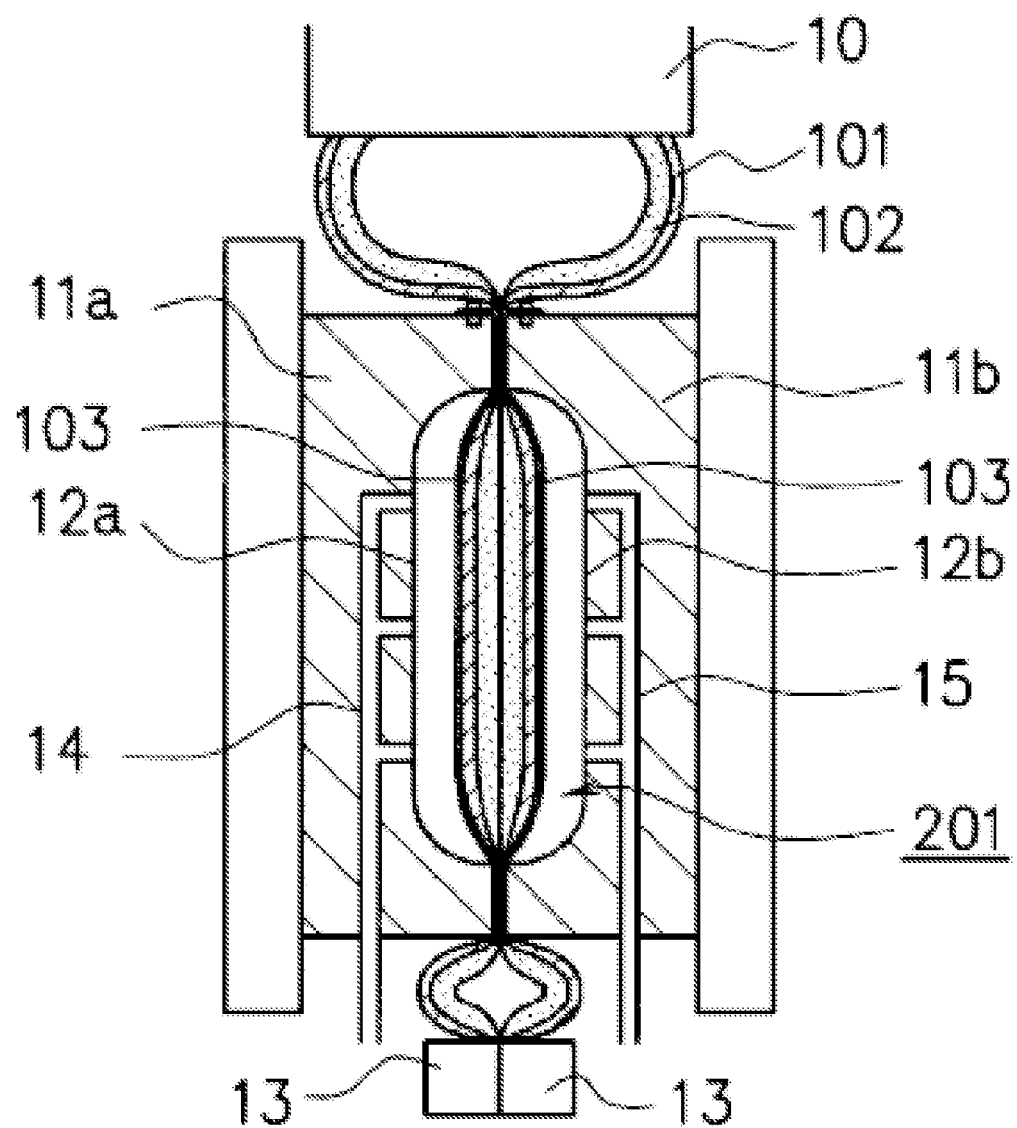
FIG. 16 is a 3rd drawing that illustrates example of method of manufacturing of multilayer foam 100 of fifth execution form.
Figure 17:
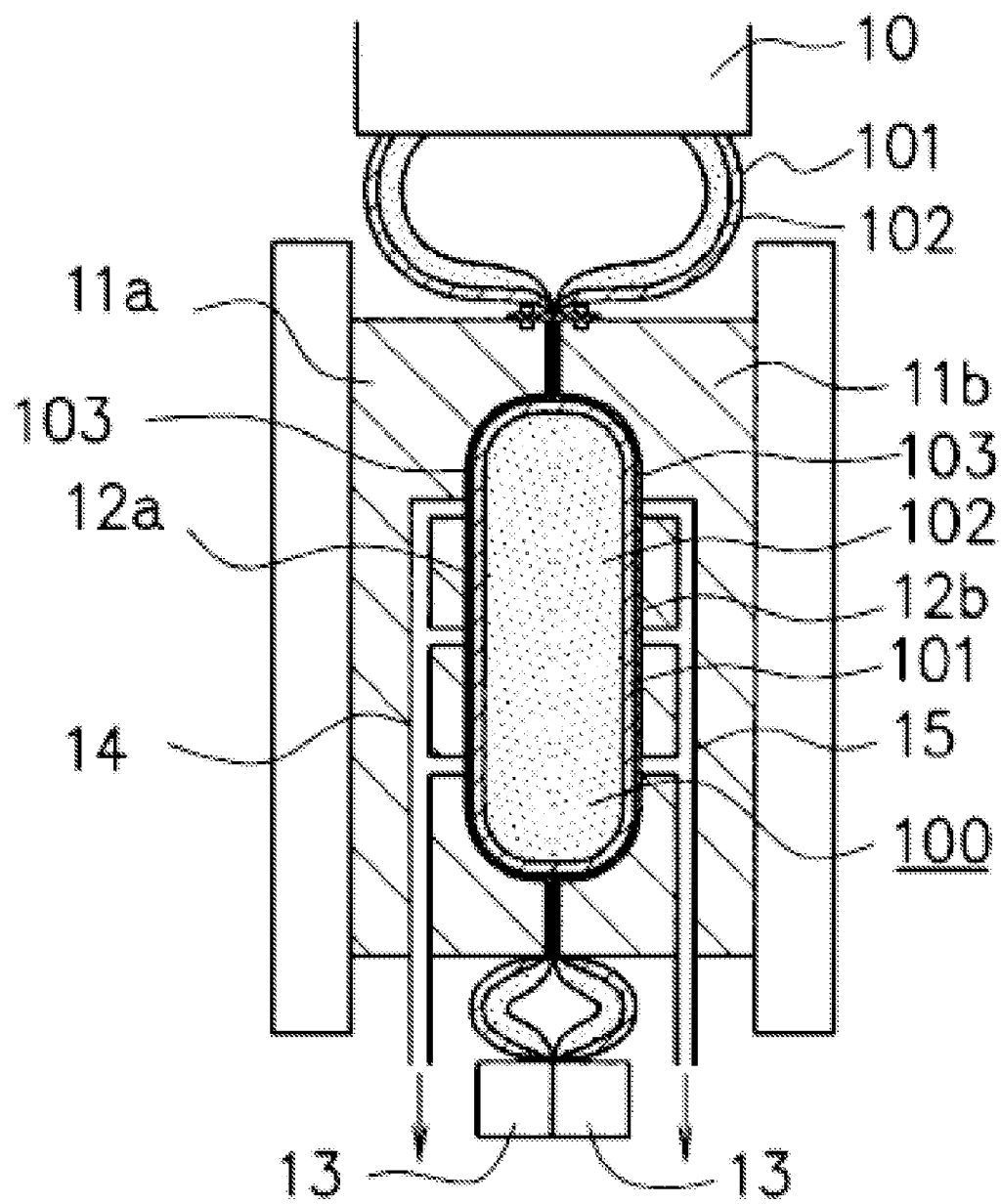
FIG. 17 is a $4^{th}$ drawing that illustrates example of method of manufacturing of multilayer foam 100 of fifth execution form.

After forming multilayer parison laminating body 201 that has epidermal material 103 as shown in FIG. 16, multilayer parison laminating body 201 is inserted and clamped in the blank space between epidermal material 103 and cavity side 12a, and 12b. And, as shown in FIG. 17, the vacuum is sucked from hole 14 arranged in cavity side 12a of split metal mold 11a and 11b and 12b and 15 by prescribed pressure. As shown in FIG. 5, multilayer sheet laminating body 201 is molded in the shape along cavity side 12a and 12b and secondary foaming of foam layer 102 composed of multilayer parison laminating body 201 is performed. The foam magnification of foam layer 102 is enlarged further. As a result, multilayer parison laminating body 201 having epidermal material 103 is molded in the shape along cavity side 12a and 12b. Multilayer foam 100 of the high foam magnification that has epidermal material 103 can be molded.

Action and Effect of Method for Manufacturing of Multilayer Foam 100 in this Execution Form Thus, epidermal material 103 is arranged between split metal mold 11a, 11b, and multilayer parison 200 in this execution form as shown in FIG. 14. And, multilayer parison 200 is pushed out between split metal mold 11a and 11b. As shown in FIG. 15, the fluid is sprayed on epidermal material 103, epidermal material 103 is bonded with outermost side of multilayer parison 200, and the innermost side of multilayer parison 200 is bonded mutually. Multilayer parison laminating body 201 that has epidermal material 103 is formed. And, as shown in FIG. 16, multilayer parison laminating body 201 is inserted and clamped in the blank space between epidermal material 103 and cavity side 12a, and 12b. As shown in FIG. 17, multilayer parison laminating body 201 that has epidermal material 103 is molded in the shape along cavity side 12a and 12b. Multilayer foam 100 of the high foam magnification that has epidermal material 103 is molded. As a result, multilayer foam 100 that has epidermal material 103 can be molded.

Example 6

Sixth Execution Form

Next, it explains the sixth execution form.

In the fifth execution form, it is decided to mold multilayer foam 100 by using epidermal material 103 without the permeability.

In this execution form, multilayer foam 100 is molded by using epidermal material 103 with the permeability. Hereafter, details about multilayer foam 100 of this execution form are explained while referring to FIG. 18 to FIG. 20.

Example of Method for Manufacturing Multilayer Foam 100

Figure 18:
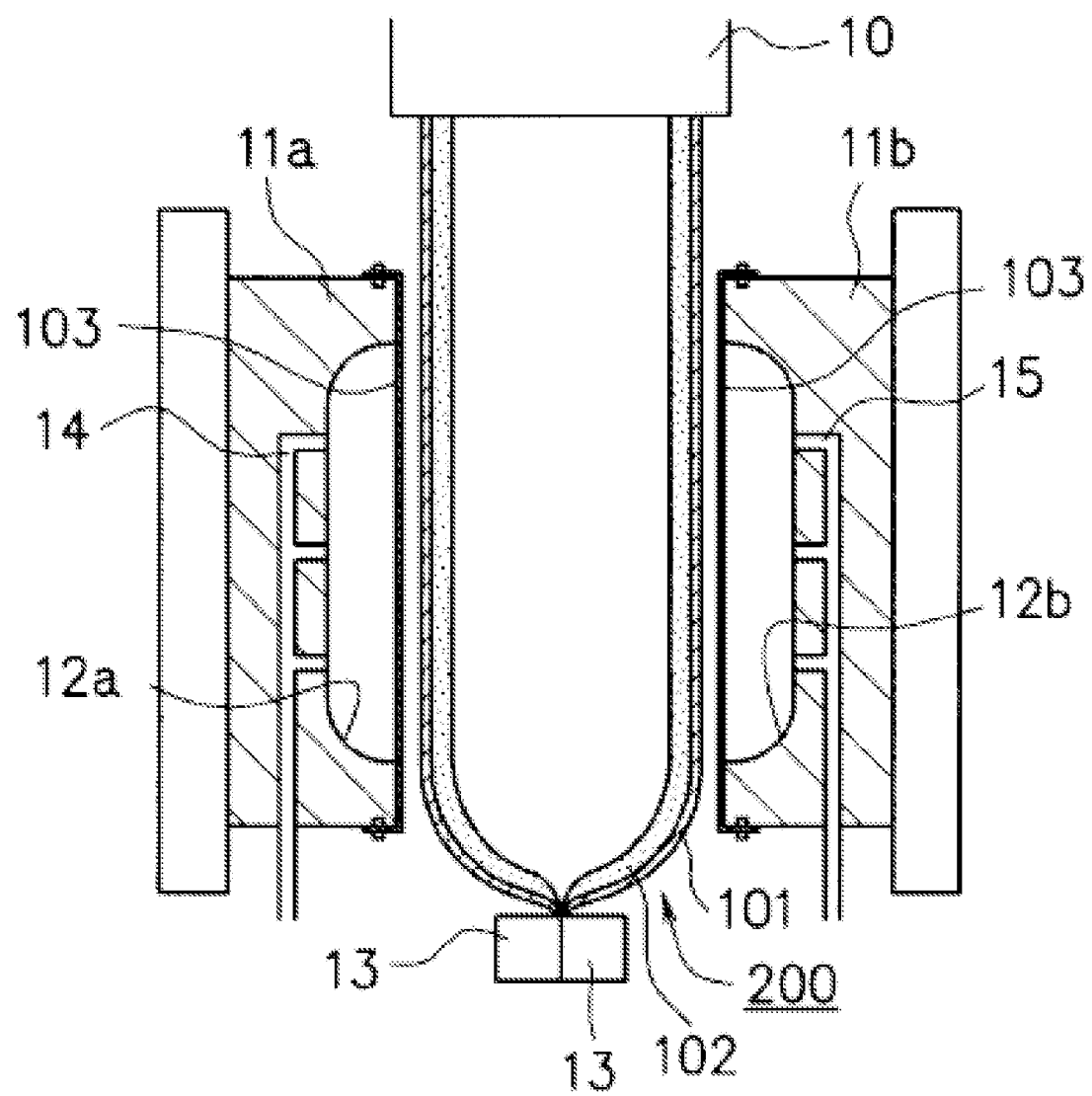
FIG. 18 is a $1^{st}$ drawing that illustrates example of method of manufacturing of multilayer foam 100 of sixth execution form.
Figure 19:
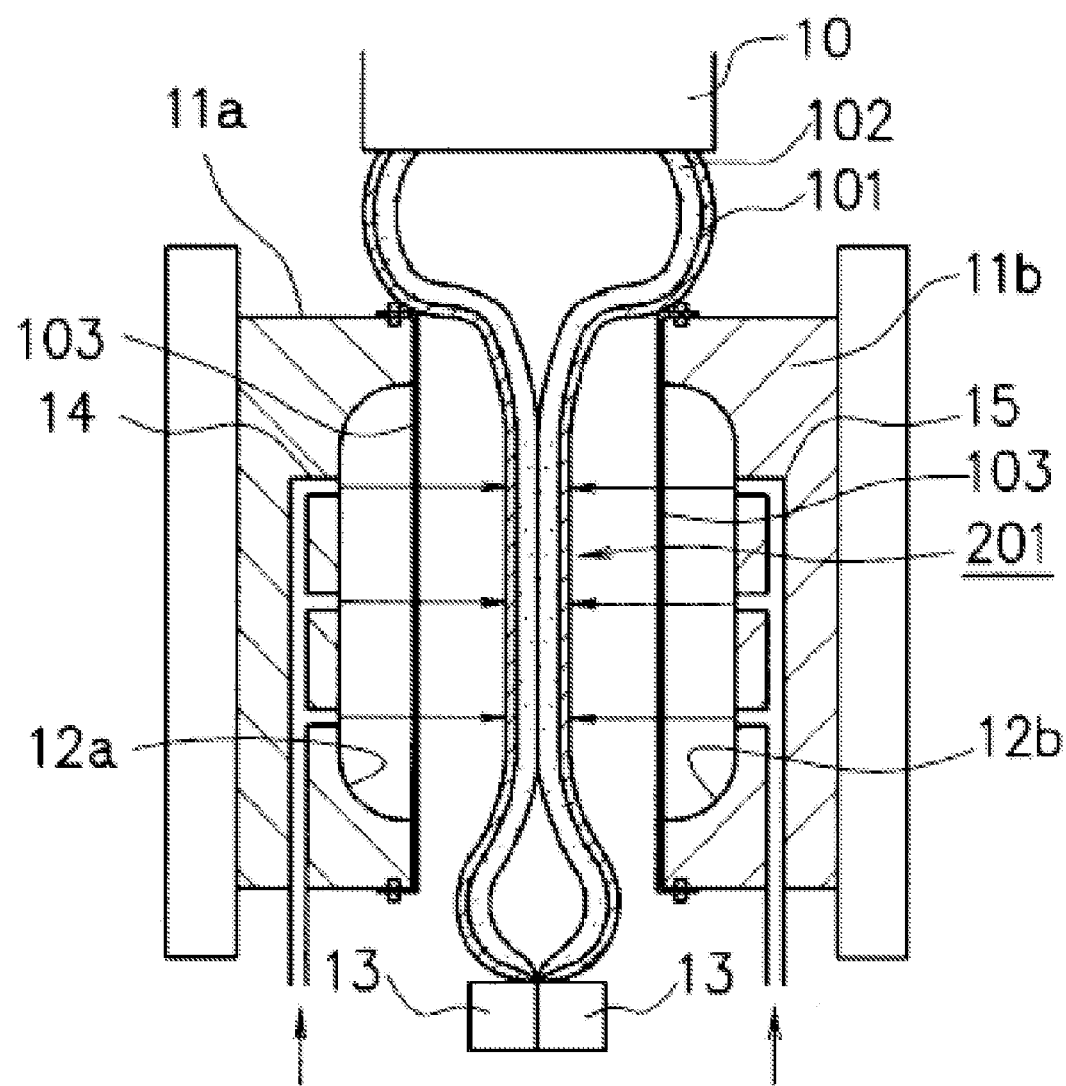
FIG. 19 is a $2^{nd}$ drawing that illustrates example of method of manufacturing of multilayer foam 100 of sixth execution form.
Figure 20:
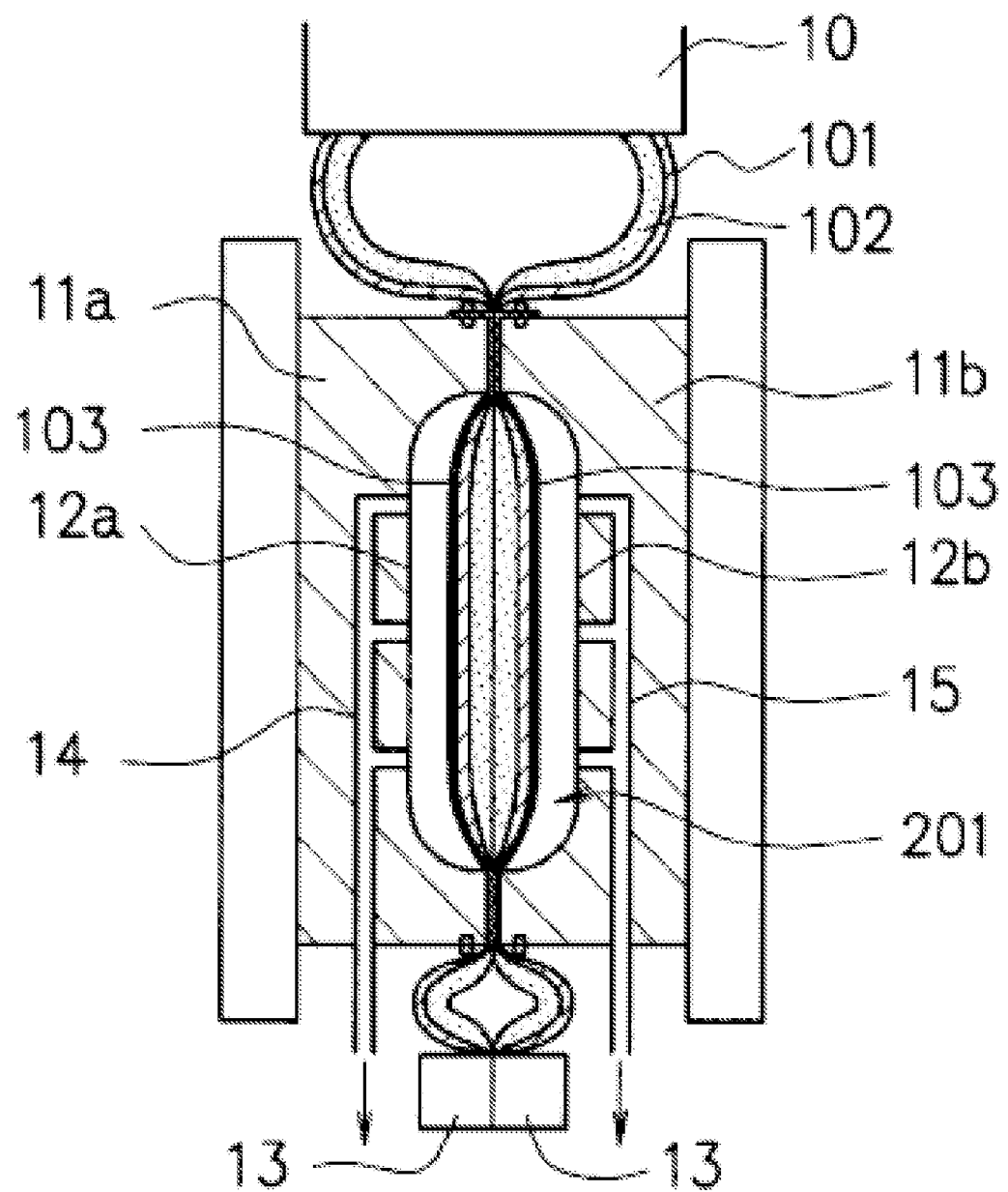
FIG. 20 is a $3^{rd}$ drawing that illustrates example of method of manufacturing of multilayer foam 100 of sixth execution form.

First of all, the example of the method of manufacturing multilayer foam 100 in this execution form is explained with reference to FIG. 18 to FIG. 20. FIG. 18-FIG. 20 shows the example of the method of manufacturing multilayer foam 100 is shown.

First of all, epidermal material 103 is arranged between split metal mold 11a, 11b, and multilayer parison 200 as shown in FIG. 18. Since epidermal material 103 is composed of the material with the permeability in this execution form, as shown in FIG. 18, upper side and a lower side of epidermal material 103 are installed in split metal mold 11a and 11b. As a result, epidermal material 103 can be fixed.

Next, as shown in FIG. 19, Split metal mold 11a and 11b are moved. Blowing in from hole 14, 15 arranged in cavity side 12a of division metal mold 11a and 11b and 12b is performed immediately before shutting split metal mold 11a and 11b mutually with pressurizing air. Pressure is applied to multilayer parison 200 through epidermal material 103. The innermost side of multilayer parison 200 is bonded mutually. Multilayer parison laminating body 201 is formed. Multilayer parison 200 will accept the pressure of the pressurizing air that passed epidermal material 103 to epidermal material 103 in this execution form when blowing in from hole 14 and 15 with the pressurizing air because it composes of the material with the permeability. Therefore, the innermost side of multilayer parison 200 will bond mutually.

After forming multilayer parison laminating body 201, as shown in FIG. 20, multilayer parison laminating body 201 is inserted and clamped with split metal mold 11a and 11b. Epidermal material 103 is bonded with outermost side of Multilayer parison laminating body 201. In this case, it is desirable to detach upper side or a lower side of epidermal material 103 from split metal mold 11a and 11b. As a result, epidermal material 103 can be easily bonded outside Multilayer parison laminating body 201.

Next, as shown in FIG. 17, the vacuum is sucked from holes 14 and 15 arranged in cavity side 12a and 12b of split metal mold 11a and 11b by prescribed pressure. Secondary foaming of foam layer 102 composed of multilayer parison laminating body 201 is performed and epidermal material 103 is molded in the shape along with cavity side 12a, 12b. The foam magnification of foam layer 102 is enlarged further. As a result, Multilayer parison laminating body 201 that has epidermal material 103 is molded in the shape along cavity side 12a and 12b. Multilayer foam 100 of the high foam magnification that has epidermal material 103 can be molded.

Action and Effect of Method for Manufacturing of Multilayer Foam 100 in this Execution Form Thus, in this execution form, epidermal material 103 is arranged between split metal mold 11a, 11b, and multilayer parison 200 as shown in FIG. 18. Thus, in this execution form, epidermal material 103 is arranged between split metal mold 11a, 11b, and multilayer parison 200 as shown in FIG. 18. And, multilayer parison 200 is pushed out between division metal mold 11a and 11b. As shown in FIG. 19, the fluid is sprayed on multilayer parison 200 by epidermal material 103, and the innermost side of multilayer parison 200 is bonded mutually. Multilayer parison laminating body 201 is formed. And, as shown in FIG. 20, multilayer parison laminating body 201 is inserted with split metal mold 11a and 11b. Epidermal material 103 is bonded with outermost side of Multilayer parison laminating body 201. Multilayer parison laminating body 201 having epidermal material 103 is molded in shape along with cavity side 12a. 12b. Multilayer foam 100 of the high foam magnification that has epidermal material 103 is molded. As a result, multilayer foam 100 that has epidermal material 103 can be molded.

Example 7

Seventh Execution Form

Next, it explains the seventh execution form.

In the fifth and sixth execution form, fluid is sprayed on multilayer parison 200 through epidermal material 103 or epidermal material 103. The innermost side of multilayer parison 200 is bonded mutually. Multilayer parison laminating body 201 is formed and it was decided to mold multilayer foam 100 having epidermal material 103.

Figure 21:
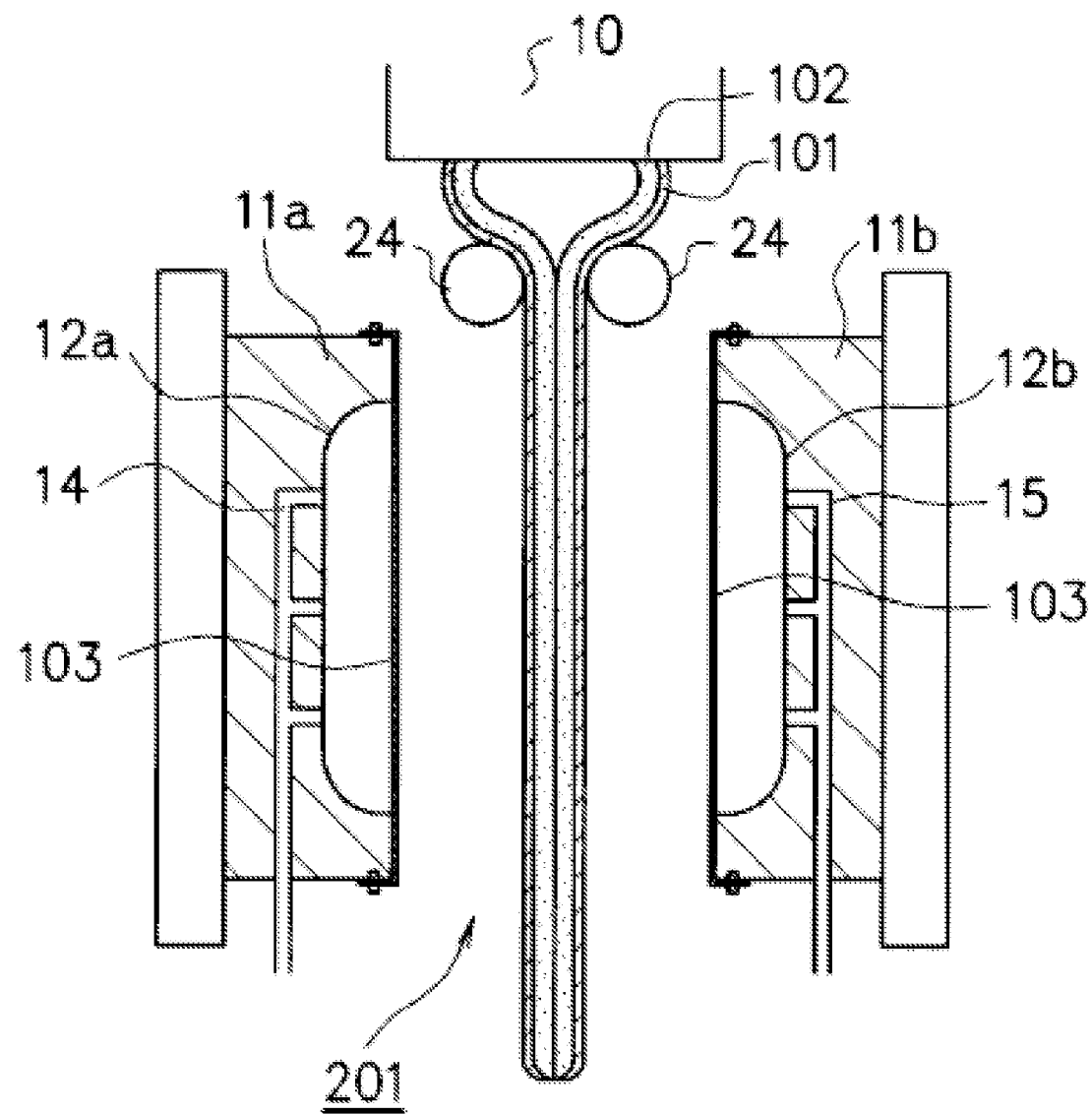
FIG. 21 is a $1^{st}$ drawing that illustrates example of method of manufacturing of multilayer foam 100 of seventh execution form.

In seventh execution form, as shown in FIG. 21, the innermost side of multilayer parison 200 is bonded mutually by using pressure roller 24. After forming Multilayer parison laminating body 201, epidermal material 103 is bonded with outermost side of multilayer parison laminating body 201. Multilayer foam 100 that has epidermal material 103 is molded. As a result, multilayer foam 100 that has epidermal material 103 can be molded similar to fourth and fifth execution form. Hereafter, the sixth execution form is explained with reference to FIG. 21 to FIG. 23.

First of all, as shown in FIG. 21, epidermal material 103 is arranged between split metal mold 11a, 11b, and multilayer parison 200. In this execution form, as shown in FIG. 21, upper side and a lower side of epidermal material 103 are installed in split metal mold 11a and 11b. As a result, epidermal material 103 can be fixed.

Next, multilayer parison 200 is pushed out of extrusion head 10. Multilayer parison 200 pushed out of extrusion head 10 is inserted and clamped between a pair of pressure roller 24. The innermost side of multilayer parison 200 is bonded mutually and multilayer parison laminating body 201 is formed.

Figure 22:
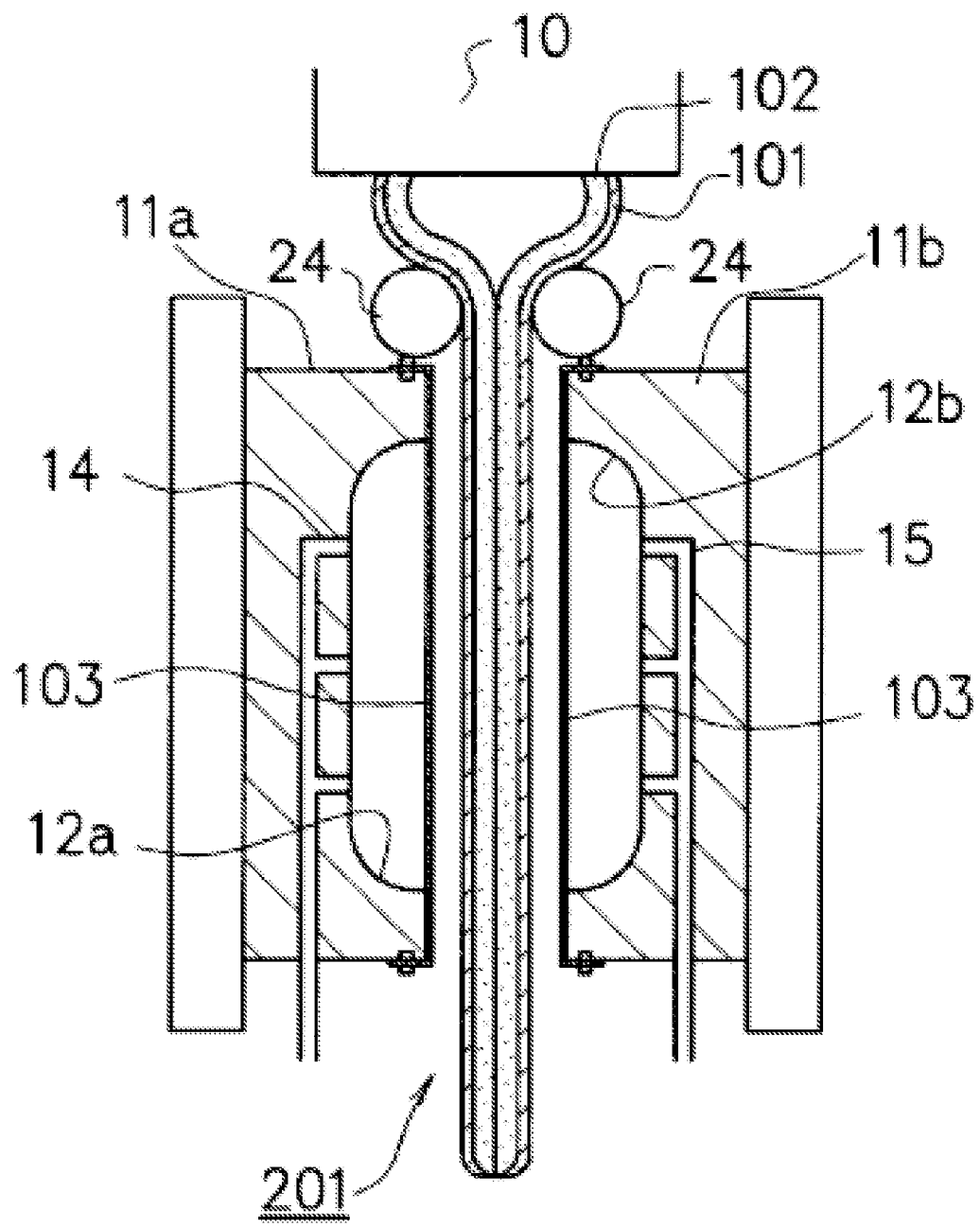
FIG. 22 is a $2^{nd}$ drawing that illustrates example of method of manufacturing of multilayer foam 100 of seventh execution form.

After forming multilayer parison laminating body 201, split metal mold 11a and 11b are moved as shown in FIG. 22. Multilayer parison laminating body 201 is inserted and clamped by split metal mold 11a and 11b. Epidermal material 103 is bonded with outermost side of Multilayer parison laminating body 201. In this case, it is desirable to detach upper side or a lower side of epidermal material 103 from split metal mold 11a and 11b. As a result, epidermal material 103 can be easily bonded with outermost side of multilayer parison laminating body 201.

Figure 23:
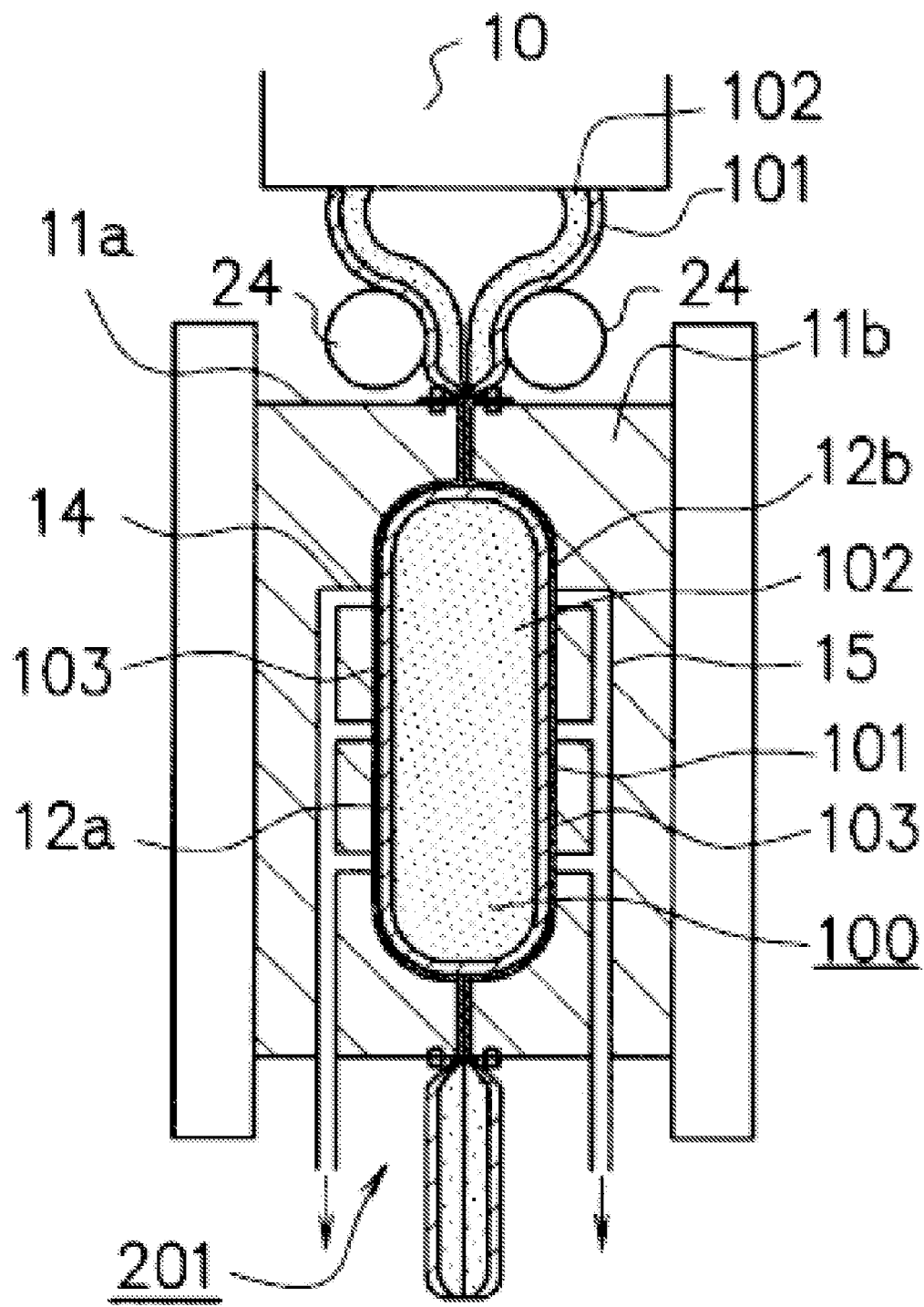
FIG. 23 is a $3^{rd}$ drawing that illustrates example of method of manufacturing of multilayer foam 100 of seventh execution form.
Figure 24:
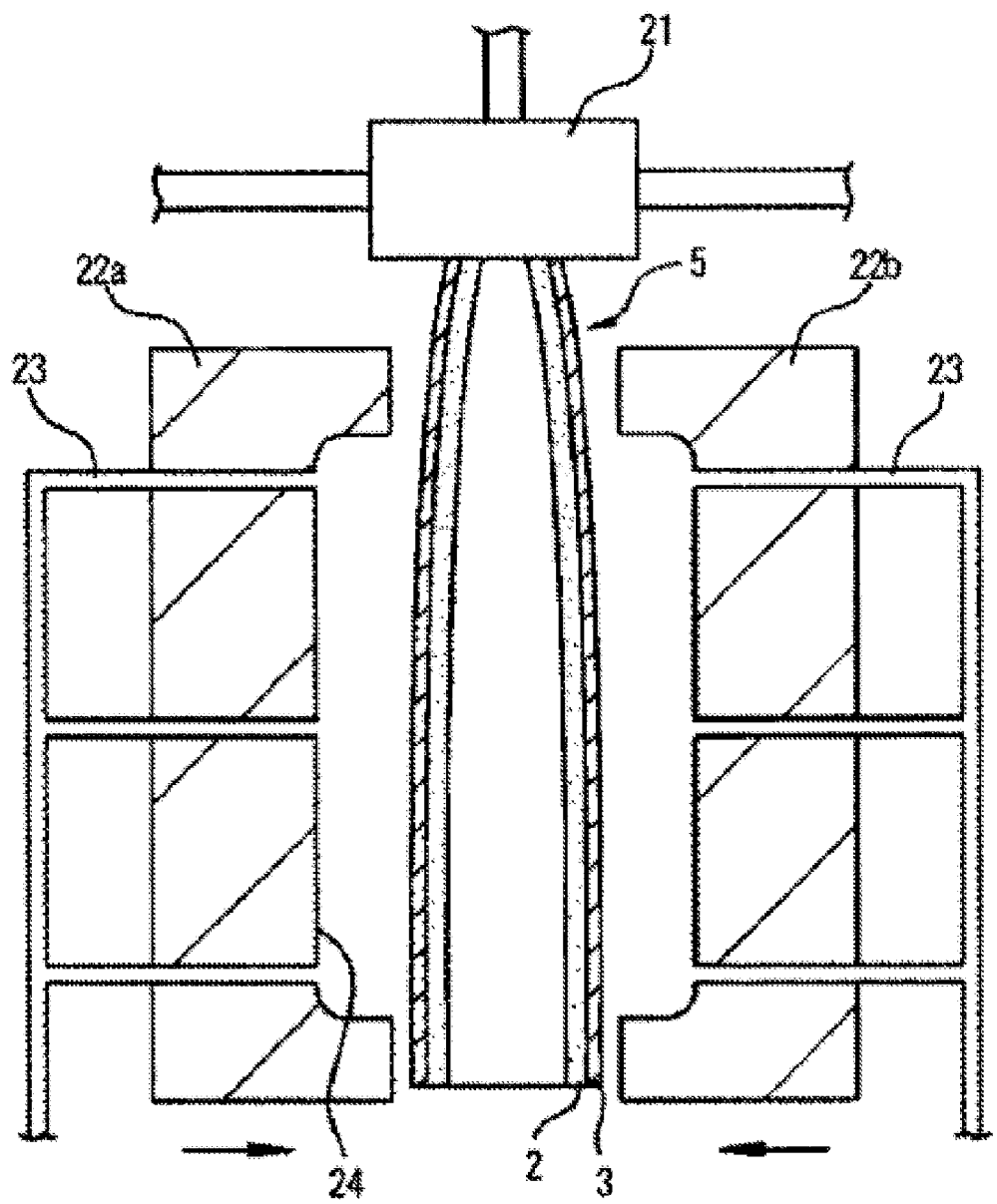
FIG. 24 is a $1^{st}$ drawing to illustrates the example of the method of manufacturing past multilayer foam.
Figure 25:
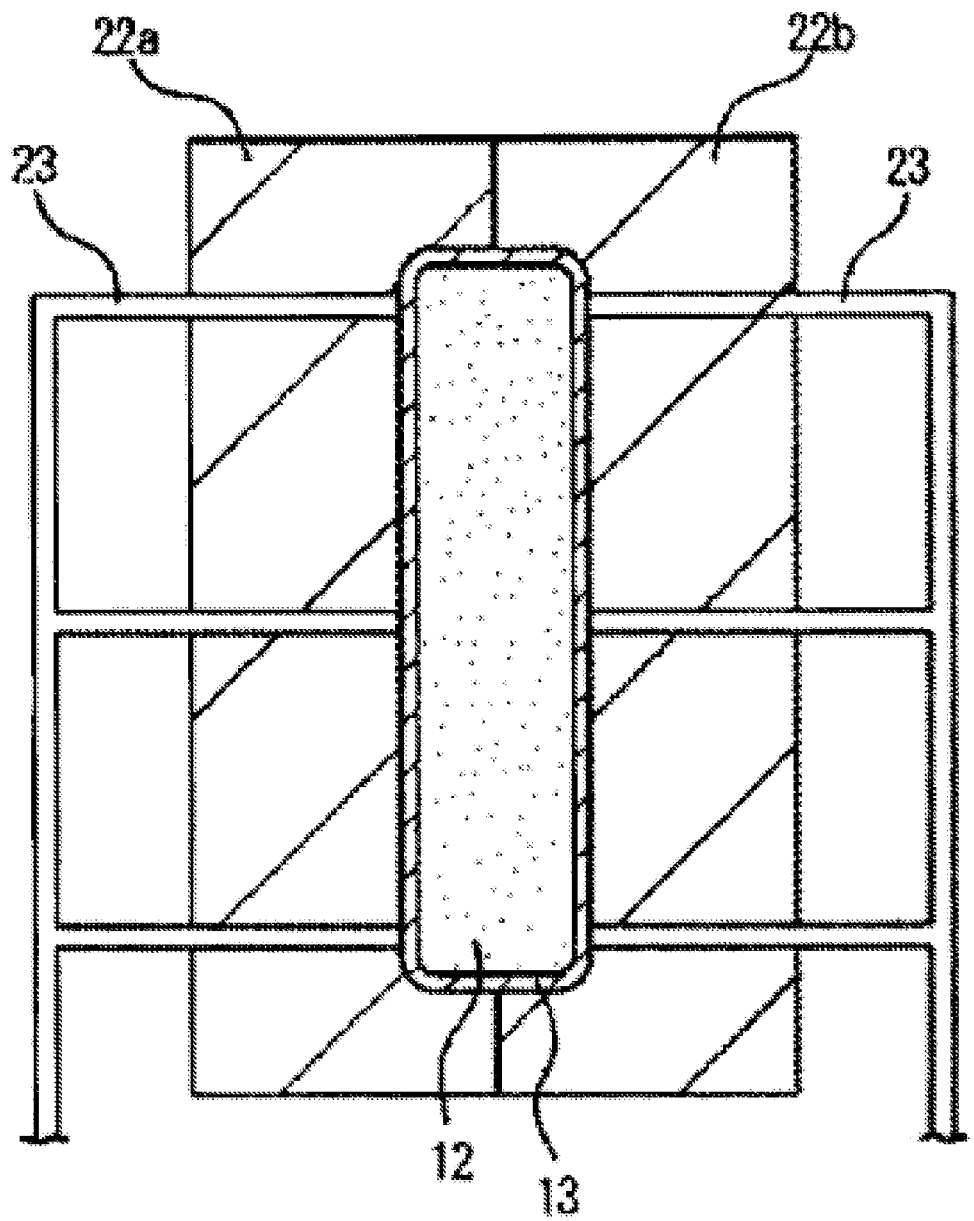
FIG. 25 is a $2^{nd}$ drawing to illustrates the example of the method of manufacturing past multilayer foam.

Next, as shown in FIG. 23, the vacuum is sucked from holes 14 and 15 arranged in cavity side 12a and 12b of split metal mold 11a and 11b by prescribed pressure. They are made to mold epidermal material 103 in the shape along cavity side 12a and 12b, and to foam the second foam layers 102 where multilayer parison laminating body 201 is composed. The foam magnification of foam layer 102 is enlarged further. As a result, multilayer parison laminating body 201 that has epidermal material 103 is molded in the shape along cavity side 12a and 12b. Multilayer foam 100 of the high foam magnification that has epidermal material 103 can be molded.

Action and Effect of Method for Manufacturing of Multilayer Foam 100 in this Execution Form Thus, in this execution form as shown in FIG. 21, inner side of multilayer parison 200 is bonded mutually by using Pressure roller 24. After forming multilayer parison laminating body 201, Epidermal material 103 is bonded with outermost side of multilayer parison laminating body 201. Multilayer foam 100 of the high foam magnification that has epidermal material 103 is molded. As a result, multilayer foam 100 that has epidermal material 103 can be molded.

The execution form mentioned above is a suitable execution form of this invention. It is not limited to the range of this invention only in the above-mentioned execution form. The execution of form that gives various changes is possible in the range where the summary of this invention doesn't deviate.

For instance, the case when multilayer parison 200 was used is explained in the 5th-7th execution form mentioned above. However, it is also possible to do the 5th-seventh execution form by using multilayer sheet 200 similar to the fourth execution form.

Moreover, multilayer foam 100 is molded by using division metal mold 11a and 11b without ribs in the execution form mentioned above. However, it is also possible to mold multilayer foam 100 by using split metal mold 11a and 11b with ribs. The rib comes in contact with multilayer parison 200 when division metal mold 11a and 11b are clamped mutually by installing the rib in split metal mold 11a and 11b. For bonding the innermost side of multilayer parison 200 mutually, dead air generation becomes difficult further. Moreover, since the concave portion will be formed on the surface of multilayer foam 100 with the rib, reducing the capacity of multilayer foam 100, and attempting lightening multilayer foam 100 become possible. Therefore, it is also possible to mold multilayer foam 100 by using split metal mold 11a and 11b with ribs according to the use of multilayer foam 100.

Moreover, multilayer foam 100 is composed having one layer of each non-foam layer 101 and foam layer 102 in the execution form mentioned above. However, it is also possible to compose multilayer foam 100 with all layer compositions even if it is composed with one layer of each foam layer 102 and non-foam layer 101 respectively.

Moreover, the case when two split metal mold 11a and 11b were used is explained in the above-mentioned execution form. However, it is also possible to use arbitrary number of split metal molds that division metal mold 11a and 11b and it is not limited to two split metal molds 11a, 11b.

Moreover, it explained multilayer foam 100 suitable for the car in the execution form mentioned above. However, use of multilayer foam 100 in this execution form is not limited to the car. It can also be applied to transport aircrafts such as the train, ships, and aircraft by proper design change in the shape of multilayer foam 100. Multilayer foam 100 in this execution form can decrease the cost of the transport aircraft and also improve the mileage of the transport aircraft since weight saving and cost lowering is possible. Moreover, multilayer foam 100 in this execution form can be applied also to the material for construction materials, for housings of various electric equipment, and for the sports leisure etc.

EXPLANATION OF CODES/SYMBOLS

Multilayer foam
101 Non-foam layer
102 Foam layer
103 Epidermal material
200 Multilayer parison, Multilayer sheet (Multilayer resin)
201 Multilayer parison laminating body, Multilayer sheet laminating body (Multilayer resin laminating body)
10 Extrusion head
11a, 11b Split metal mold
12a, 12b Cavity side
13 Lower pinch
14, 15 Hole
24 Pressure roller
1 Extrusion device
2 Clamping device
31 First accumulator
32 Second accumulator
33 First plunger
34 Second plunger 35 First T die
36 Second T die
37 First extruding machine
38 Second extruding machine
39 First thermoplastic resin supply hopper
40 Second thermoplastic resin supply hopper
41 First pair of roller
42 Second pair of roller
43 Slit space adjustment device
18 First thermoplastic resin sheet
19 Second thermoplastic resin sheet

What is claimed is:

1. A method for manufacturing multilayer foam comprising:
extruding a multilayer resin having an outer non-foam layer and an inner foam layer said inner foam layer having an innermost surface;
bonding innermost surface of said inner foam layer to itself by a pressure applicator selected from the group of pressure applicators consisting of pressurized fluid and paired pressure rollers, before clamping said multilayer resin in a split metal mold; and
clamping said mold where said multilayer resin laminating body is inserted in said mold as the space between cavity side and outermost side of said multilayer resin laminating body and said multilayer resin laminating body is molded in the shape along said cavity side and molding process of molding the multilayer foam.

2. The method for manufacturing of multilayer foam according to claim 1, wherein said bonding comprises bonding said innermost side of said multilayer resin and spraying fluid on outermost side of said multilayer resin.

3. The method for manufacturing of multilayer foam according to claim 2, wherein said method comprises molding said multilayer resin laminating body in shape along said cavity side, and said metal mold has two or more holes on said cavity side; in said bonding, fluid is spread on outermost side of said multilayer resin through said multiple holes; the innermost side of said multilayer resin is bonded mutually; in said molding process gas in the said metal mold is sucked through said two or more holes.

4. The method for manufacturing multilayer foam according to claim 3, wherein the pressure of said fluid accepted in the center part of said multilayer resin is larger than the pressure of said fluid accepted at the edge of said multilayer resin when the fluid is sprayed on the outside of said multilayer resin.

5. The method for manufacturing multilayer foam according to claim 1, wherein the interval on center part of pair of cavity side is smaller than the interval on the edge of a pair of said cavity side when said metal mold is clamped.

6. The method for manufacturing of the multilayer foam according to claim 1, wherein said method is characterized by molding the multilayer foam that has the epidermal material by arranging epidermal material between a metal mold and multilayer resin.

7. The method for manufacturing of multilayer foam according to claim 1, wherein said multilayer resin is cylindrical multilayer parison.

8. The method for manufacturing multilayer foam according to claim 1, wherein said multilayer resin is multilayer sheet.

* * * * *